(12) United States Patent
Keady

(10) Patent No.: US 11,700,495 B2
(45) Date of Patent: Jul. 11, 2023

(54) DEVICE AND METHOD TO REDUCE EAR WAX CLOGGING OF ACOUSTIC PORTS, HEARING AID SEALING SYSTEM, AND FEEDBACK REDUCTION SYSTEM

(71) Applicant: Staton Techiya LLC, Delray Beach, FL (US)

(72) Inventor: John P. Keady, Fairfax Station, VA (US)

(73) Assignee: Staton Techiya LLC, Delray Beach, CA (US)

( * ) Notice: Subject to any disclaimer, the term of this patent is extended or adjusted under 35 U.S.C. 154(b) by 0 days.

(21) Appl. No.: 17/989,677

(22) Filed: Nov. 17, 2022

(65) Prior Publication Data

US 2023/0082717 A1 Mar. 16, 2023

Related U.S. Application Data

(60) Continuation of application No. 17/492,793, filed on Oct. 4, 2021, which is a continuation of application
(Continued)

(51) Int. Cl.
*H04R 25/00* (2006.01)
*B33Y 80/00* (2015.01)
*B33Y 50/00* (2015.01)

(52) U.S. Cl.
CPC ............ *H04R 25/654* (2013.01); *B33Y 50/00* (2014.12); *B33Y 80/00* (2014.12); *Y10T 29/49005* (2015.01)

(58) Field of Classification Search
CPC ...... H04R 25/654; B33Y 50/00; B33Y 80/00; Y10T 29/49005
(Continued)

(56) References Cited

U.S. PATENT DOCUMENTS

| 2,803,308 A | 8/1957 | Mattia |
| 6,094,494 A | 6/2000 | Haroldson |

(Continued)

FOREIGN PATENT DOCUMENTS

| DE | 102012221233 | 3/2014 |
| DE | 102013203334 | 5/2014 |

(Continued)

*Primary Examiner* — Sean H Nguyen
(74) *Attorney, Agent, or Firm* — Akerman LLP; Peter A. Chiabotti

(57) ABSTRACT

Devices and methods to reduce ear wax clogging of acoustic ports, hearing aid systems, and feedback reduction systems are provided. A conformal hearing aid includes a hearing aid body, where the hearing aid body houses a microphone and a receiver, where the microphone is positioned within the hearing aid body to measure acoustic signals from an ambient environment, and where the receiver is positioned within the hearing aid body to emit acoustic signals toward a tympanic membrane of a user; an expandable element, where the expandable element is operatively connected to the hearing aid body, and where the expandable element is configured to encompass a circumferential portion of the hearing aid body when expanded; and an inflation management system, where the inflation management system is configured to expand the expandable element when actuated.

16 Claims, 20 Drawing Sheets

Related U.S. Application Data

No. 17/092,221, filed on Nov. 7, 2020, now Pat. No. 11,223,918, which is a continuation of application No. 16/945,798, filed on Jul. 31, 2020, now Pat. No. 10,979,831, which is a continuation of application No. 16/874,844, filed on May 15, 2020, now Pat. No. 10,897,678, which is a continuation of application No. 14/017,711, filed on Sep. 4, 2013, now Pat. No. 10,715,940, which is a division of application No. 12/579,673, filed on Oct. 15, 2009, now Pat. No. 8,554,350.

(60) Provisional application No. 61/105,761, filed on Oct. 15, 2008, provisional application No. 61/176,013, filed on May 6, 2009.

(58) Field of Classification Search
USPC .................................................. 381/322, 329
See application file for complete search history.

(56) References Cited

U.S. PATENT DOCUMENTS

| | | | |
|---|---|---|---|
| 6,513,621 B1 | 2/2003 | Deslauriers et al. | |
| 6,671,381 B1 * | 12/2003 | Lux-Wellenhof | H04R 25/656 |
| | | | 381/328 |
| 7,130,437 B2 | 10/2006 | Stonikas et al. | |
| 7,227,968 B2 * | 6/2007 | van Halteren | H04R 25/656 |
| | | | 381/328 |
| 8,047,207 B2 | 11/2011 | Perez et al. | |
| 8,186,478 B1 | 5/2012 | Grason | |
| 8,229,128 B2 | 7/2012 | Keady | |
| 8,251,925 B2 | 8/2012 | Staab et al. | |
| 8,391,534 B2 | 3/2013 | Ambrose et al. | |
| 8,522,916 B2 | 9/2013 | Keady | |
| 8,548,181 B2 | 10/2013 | Kraemer | |
| 8,631,801 B2 | 1/2014 | Keady | |
| 8,649,540 B2 | 2/2014 | Killion et al. | |
| 8,678,011 B2 | 3/2014 | Goldstein et al. | |
| 8,774,435 B2 | 7/2014 | Ambrose et al. | |
| 8,792,669 B2 | 7/2014 | Harsch | |
| 8,903,113 B2 | 12/2014 | Gebert | |
| 8,942,405 B2 | 1/2015 | Jones et al. | |
| 9,288,592 B2 | 3/2016 | Basseas | |
| 9,338,568 B2 | 5/2016 | van Hal | |
| 9,462,100 B2 | 10/2016 | Usher et al. | |
| 10,045,107 B2 | 8/2018 | Kirsch et al. | |
| 10,506,320 B1 | 12/2019 | Lott | |
| 10,917,711 B2 | 2/2021 | Higgins | |
| 11,006,198 B2 | 5/2021 | Lott | |
| 11,012,770 B2 | 5/2021 | Hatfield et al. | |
| 11,294,619 B2 | 4/2022 | Usher et al. | |
| 2004/0258263 A1 | 12/2004 | Saxton et al. | |
| 2011/0079227 A1 | 4/2011 | Turncot et al. | |
| 2013/0136285 A1 | 5/2013 | Naumann | |
| 2013/0251172 A1 | 9/2013 | Mosseri | |
| 2014/0205123 A1 | 7/2014 | Lafort et al. | |
| 2016/0050483 A1 | 2/2016 | Kulavik et al. | |
| 2016/0127818 A1 | 5/2016 | Ambrose | |
| 2016/0295311 A1 | 10/2016 | Keady et al. | |
| 2018/0220239 A1 | 8/2018 | Keady et al. | |
| 2019/0387305 A1 | 12/2019 | Keady | |
| 2021/0152924 A1 | 5/2021 | Keady | |
| 2022/0061767 A1 | 3/2022 | Goldstein et al. | |

FOREIGN PATENT DOCUMENTS

| | | | | |
|---|---|---|---|---|
| EP | 1519625 A2 * | 3/2005 | ............ | G10L 15/22 |
| EP | 1841283 | 10/2007 | | |
| EP | 2749043 | 7/2014 | | |
| EP | 2991381 | 4/2019 | | |
| EP | 3068142 | 9/2019 | | |
| FR | 2560520 | 9/1985 | | |
| WO | WO-2006037156 A1 * | 4/2006 | ........... | H04R 25/502 |

\* cited by examiner

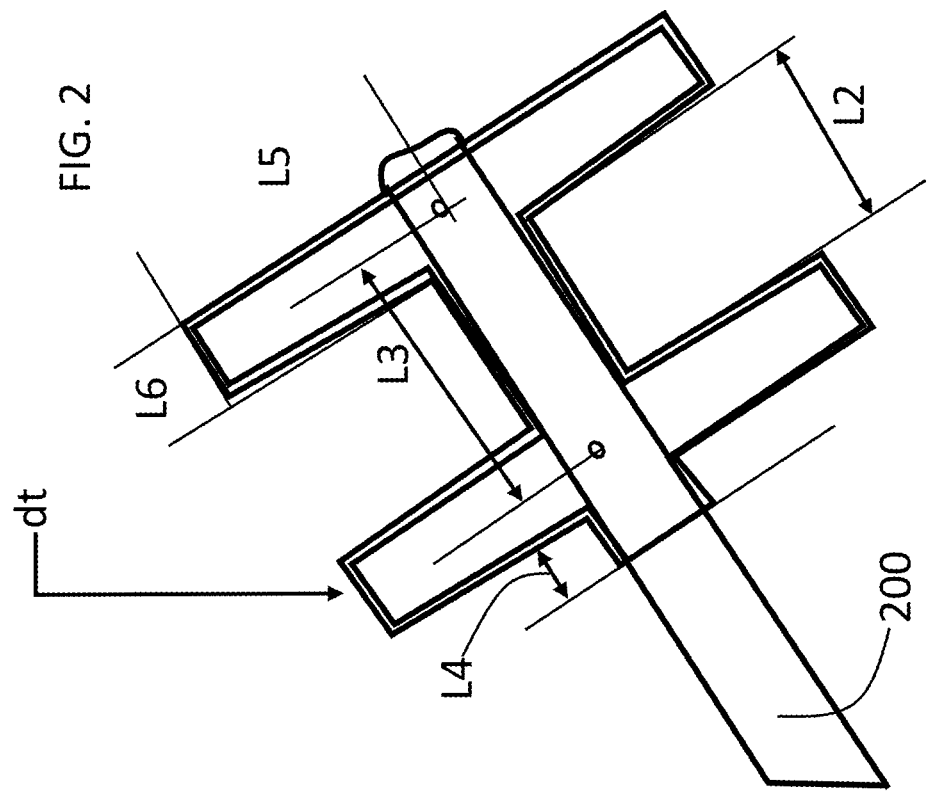
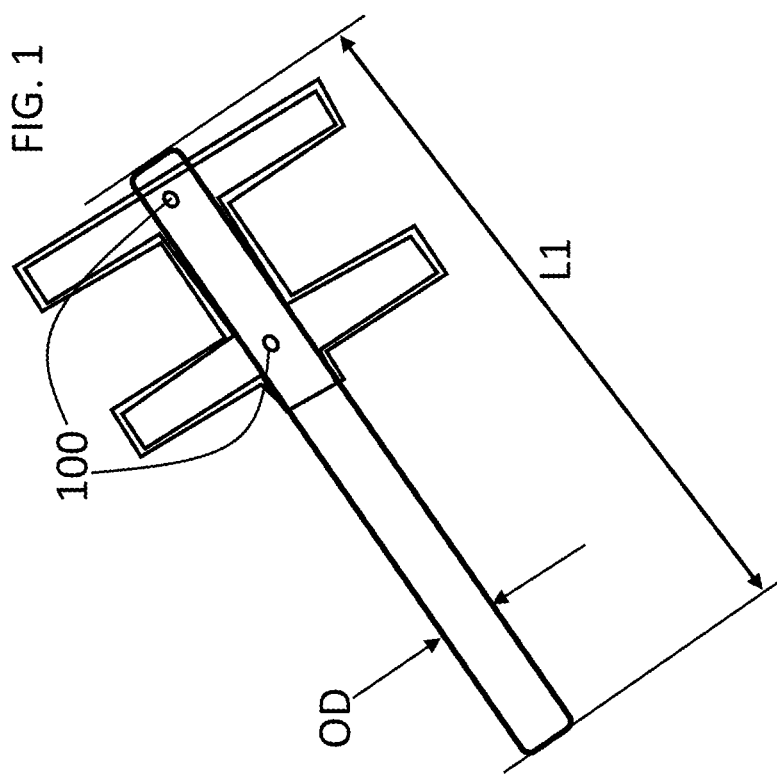

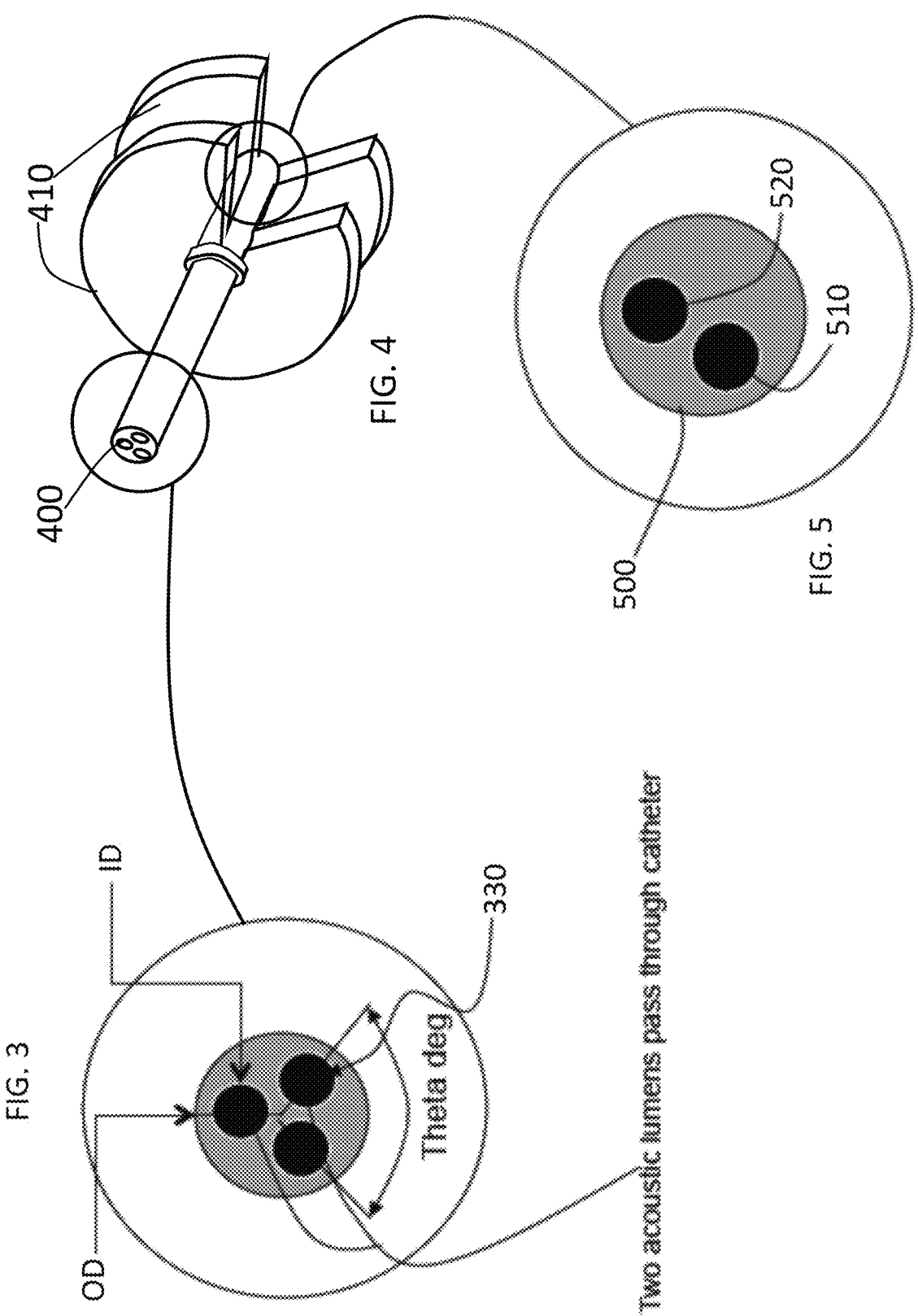

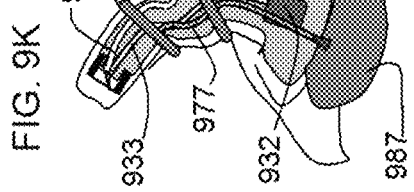
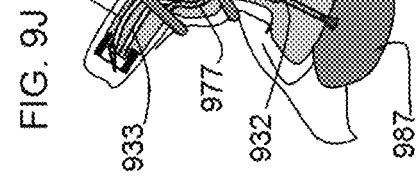
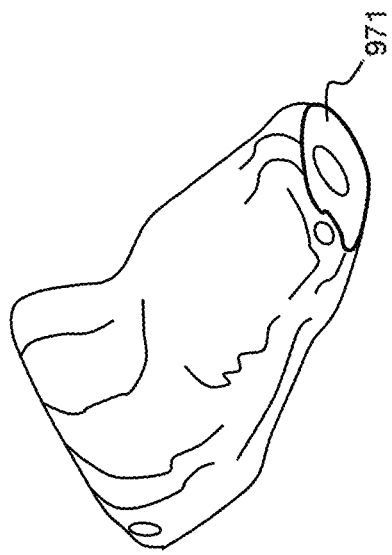
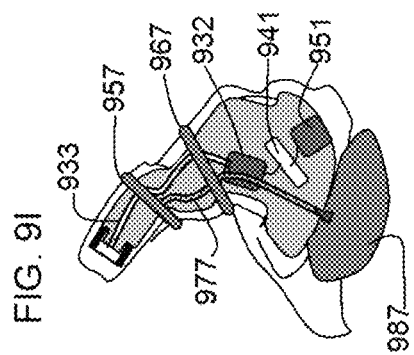

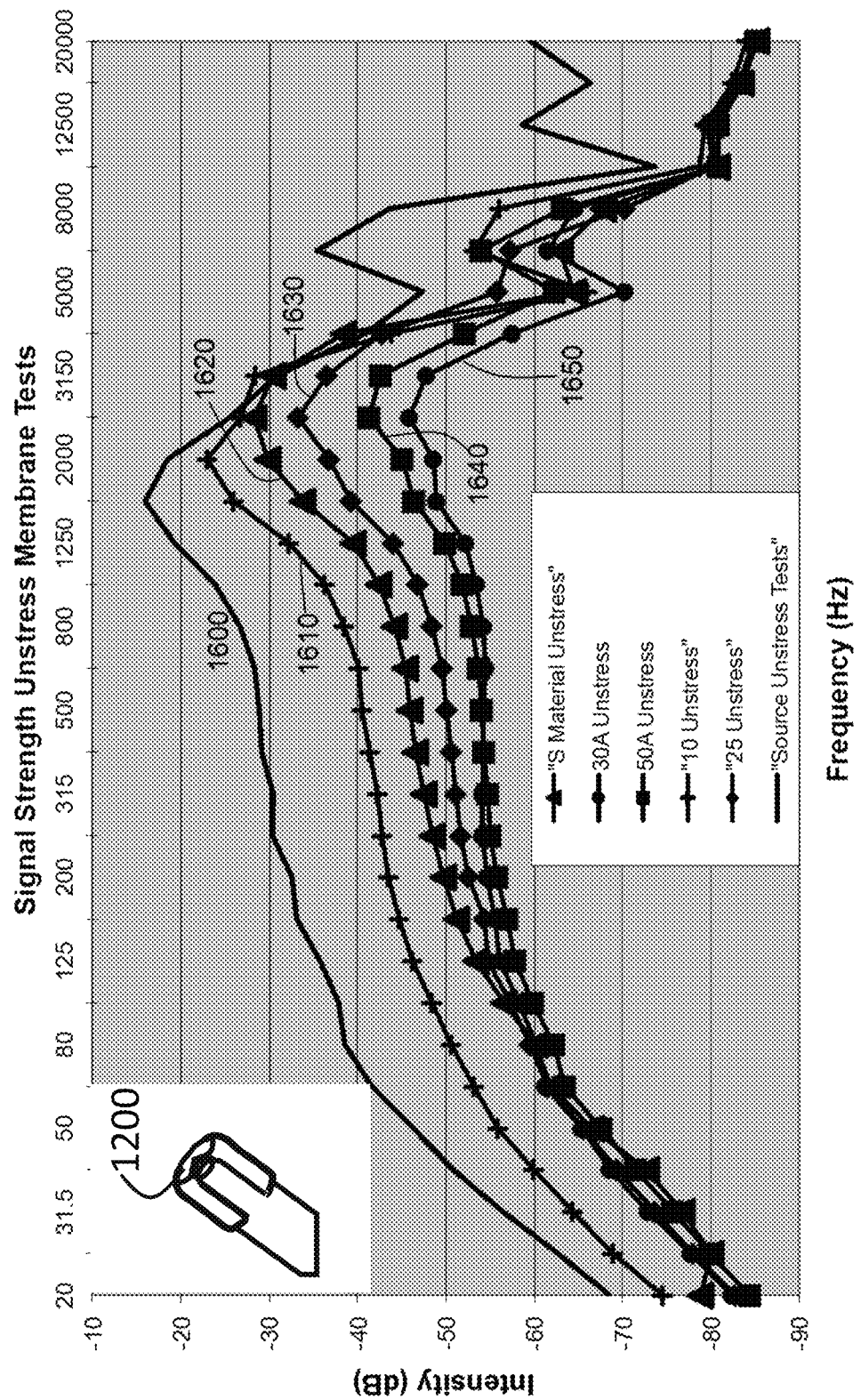
FIG. 16 Spectrum Versus Material and Stressed State of Material

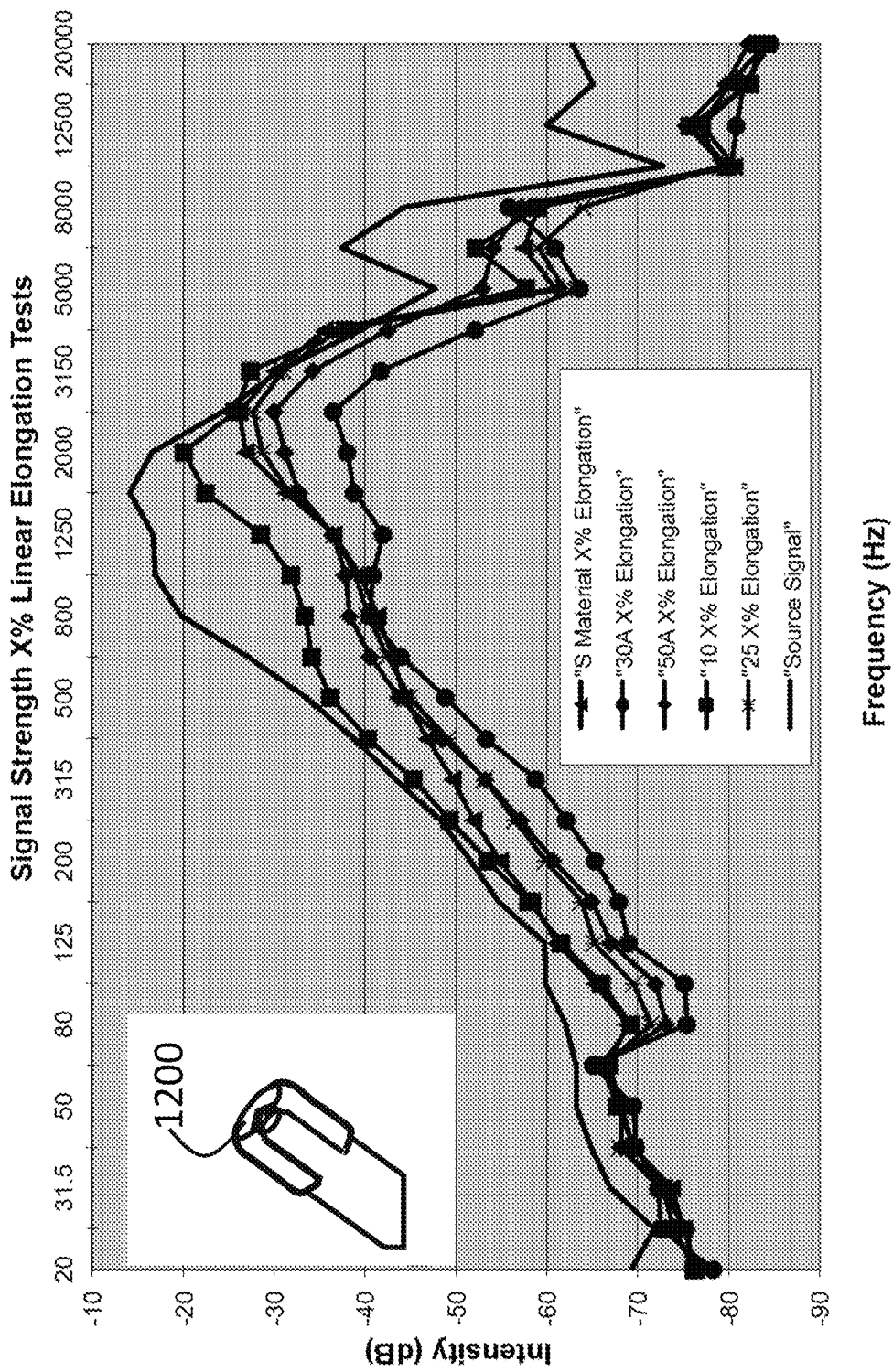
FIG. 17 Spectrum Versus Material and Stressed State of Material

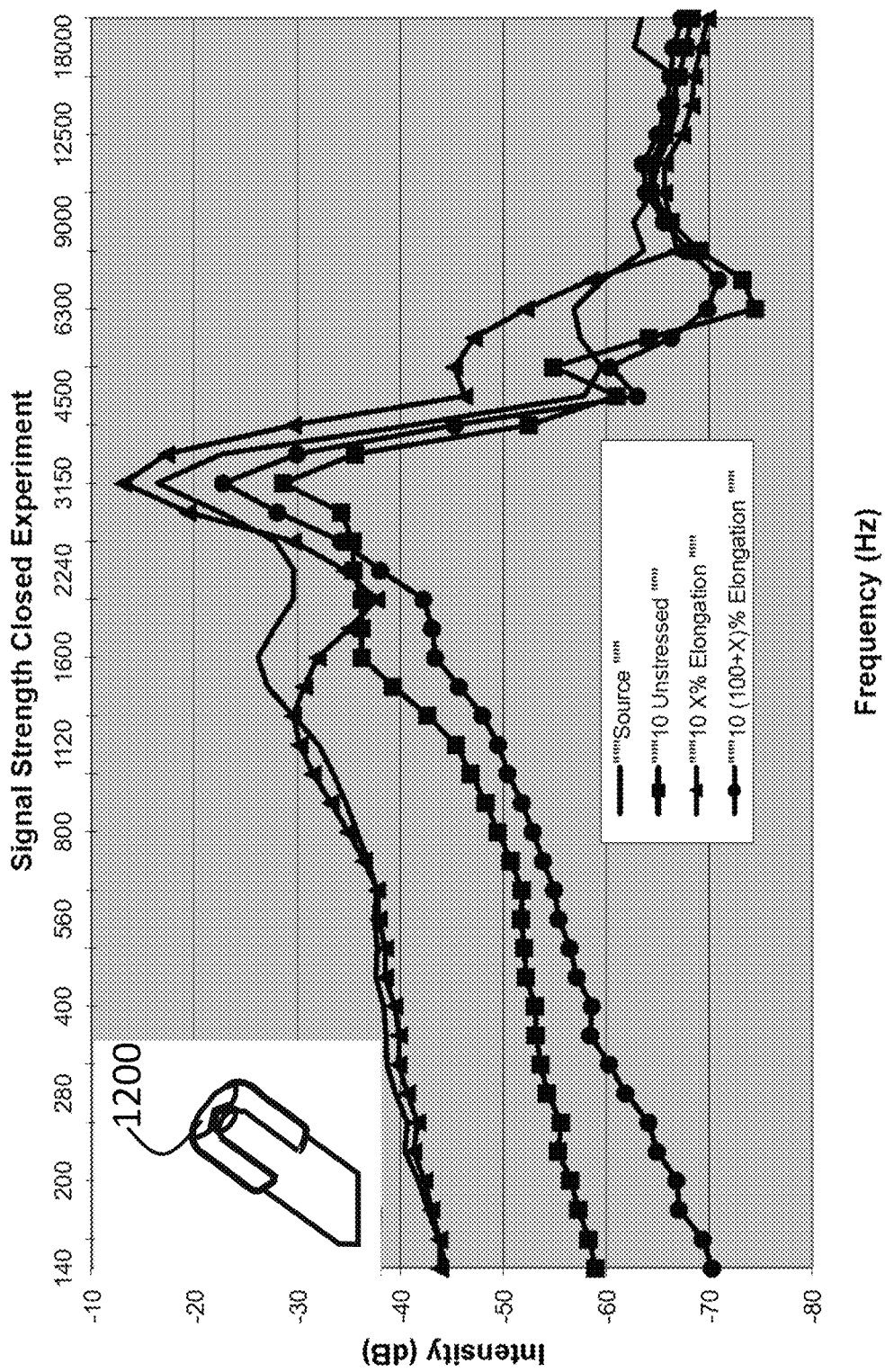
FIG. 18 Spectrum Versus Material and Stressed State of Material

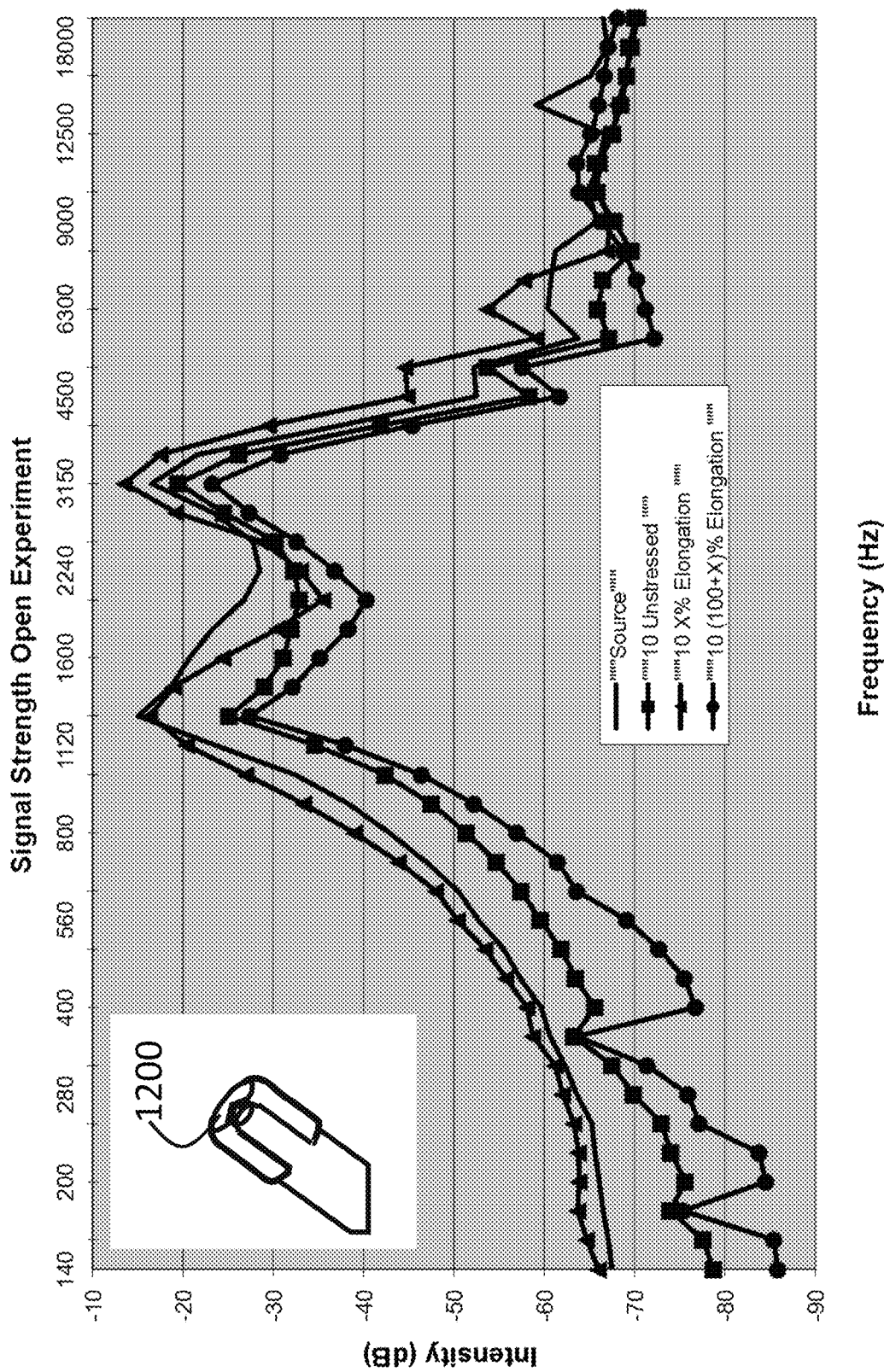
FIG. 19 Spectrum Versus Material and Stressed State of Material

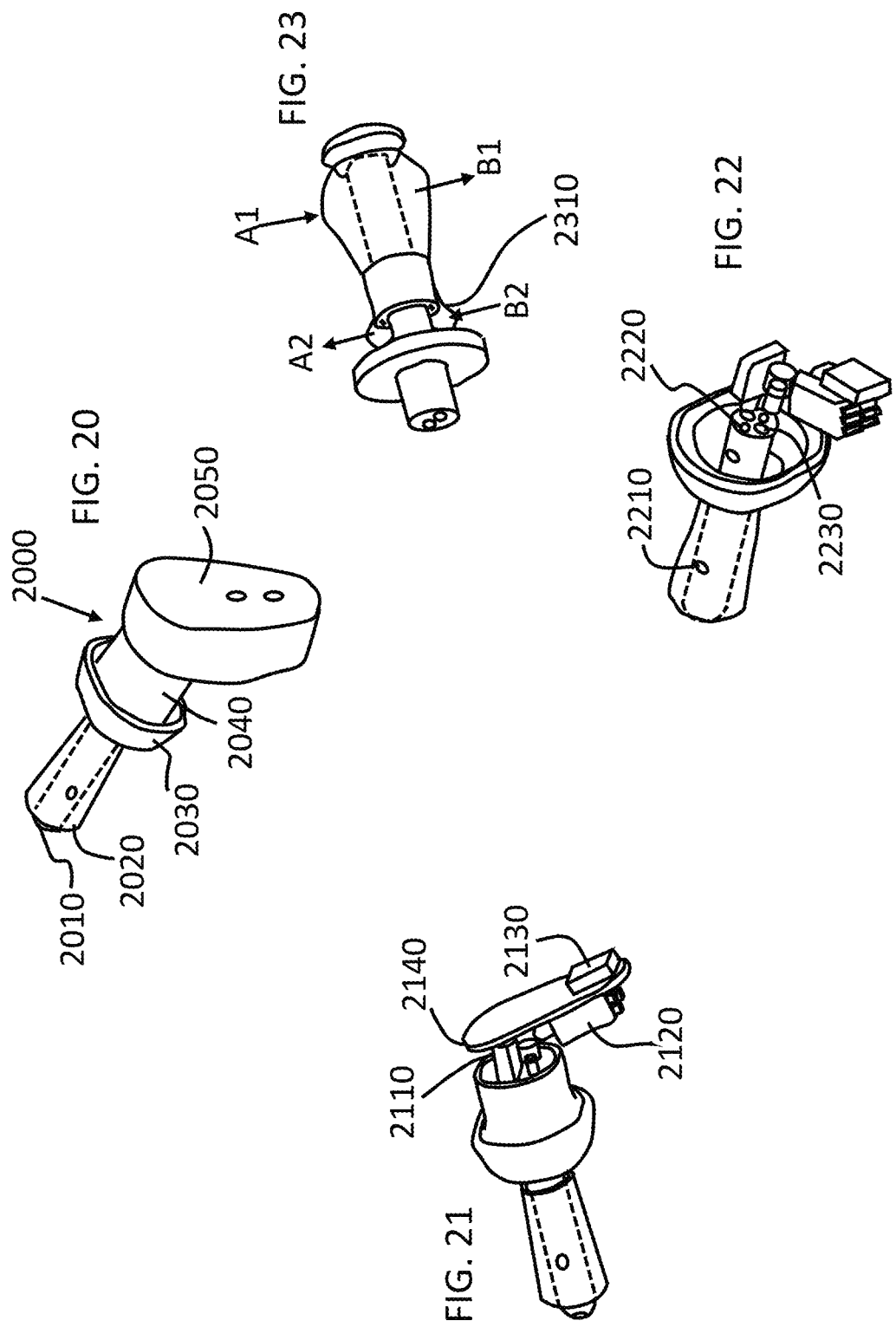

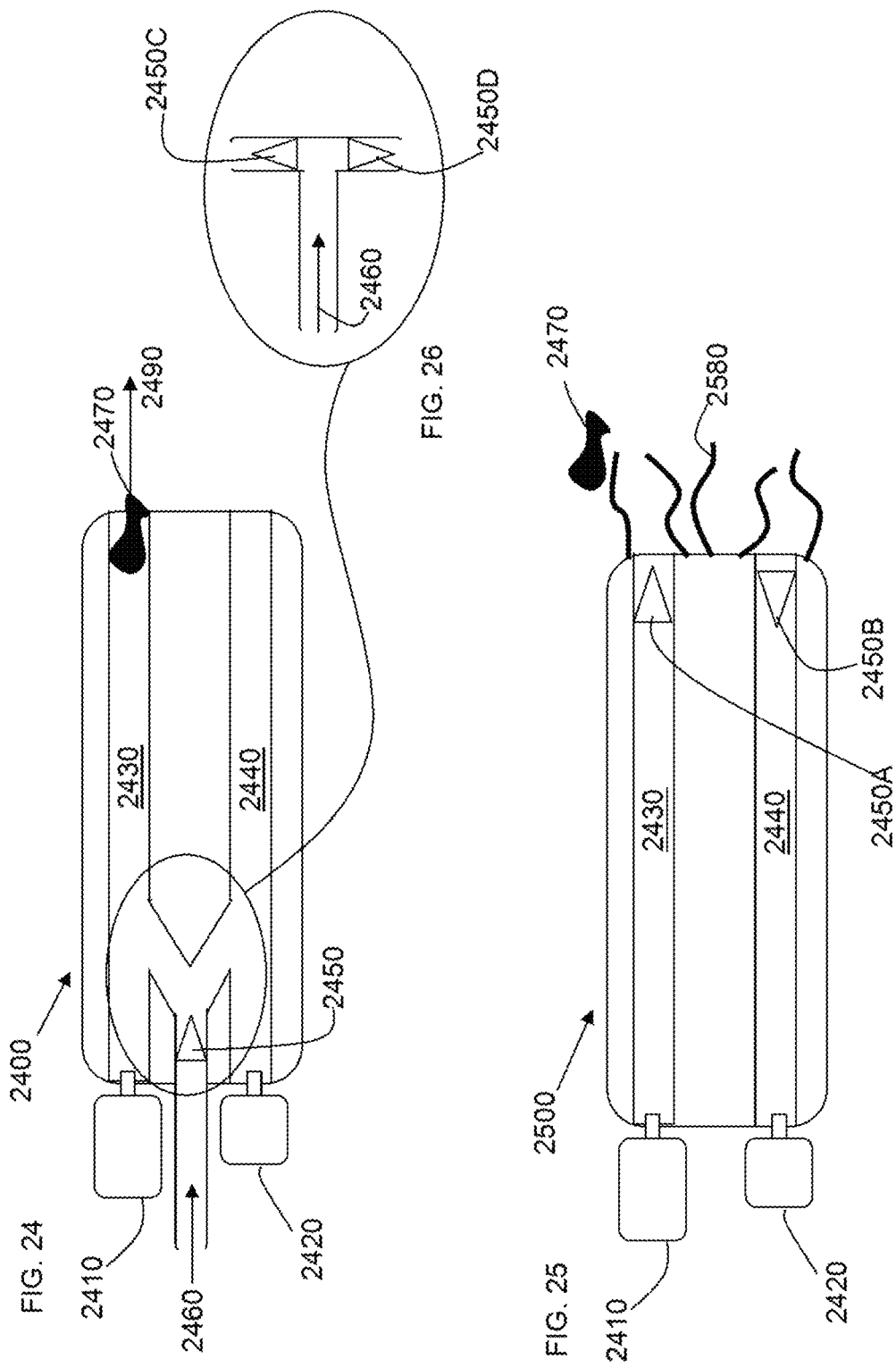

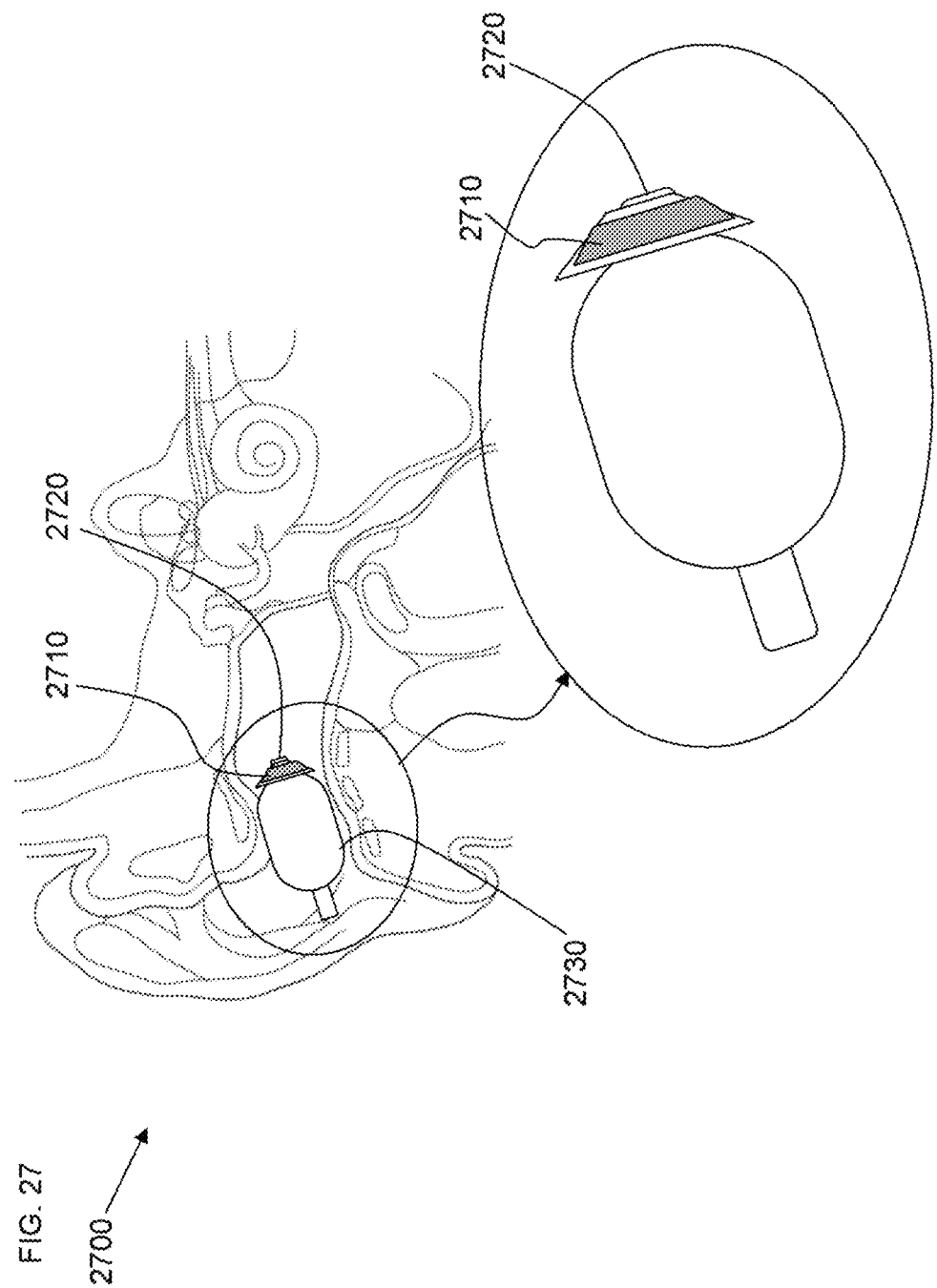

DEVICE AND METHOD TO REDUCE EAR WAX CLOGGING OF ACOUSTIC PORTS, HEARING AID SEALING SYSTEM, AND FEEDBACK REDUCTION SYSTEM

CROSS-REFERENCE TO RELATED APPLICATIONS

This application claims priority benefit of and is a continuation application of U.S. application Ser. No. 17/492,793, filed 4 Oct. 2021, which claims priority benefit of and is a continuation application of U.S. application Ser. No. 17/092,221, filed 7 Nov. 2020, which is an application that claims the priority benefit of and is a continuation application of U.S. application Ser. No. 16/945,798, filed 31 Jul. 2020, now U.S. patent Ser. No. 10/979,831, which claims the priority benefit of and is a continuation application of U.S. application Ser. No. 16/874,844, filed 15 May 2020, now U.S. patent Ser. No. 10/897,678, which claims the priority benefit of and is a continuation application of U.S. application Ser. No. 14/017,711, filed 4 Sep. 2013, now U.S. patent Ser. No. 10/715,940, which is a continuation application of divisional of U.S. application Ser. No. 12/579,673, filed Oct. 15, 2009, now U.S. Pat. No. 8,554,350, which claims the benefit of U.S. provisional patent application No. 61/105,761 filed on 15 Oct. 2008, and also claims the benefit of U.S. provisional patent application No. 61/176,013 filed on 6 May 2009. The disclosures of all of which are incorporated herein by reference in their entirety.

FIELD OF THE INVENTION

The present invention relates to devices and methods for membrane earpieces, ear wax mitigation, hearing aids, and feedback reduction.

BACKGROUND OF THE INVENTION

Various devices (e.g. headphones, earbuds, behind the ear devices, hearing aids, and other devices that direct acoustic energy into an acoustic measuring device (e.g., ear)) have been designed for various uses. Many conventional systems have difficulty sealing in the ear canal. Other orifice (e.g., ear, mouth, anus, nose, artery, vein, pipe, indentation) insertion devices additionally have sealing issues. Various methods of sealing can impact the orifice walls. The amount of impact is important for designing comfortable orifice sealing devices.

With regards to ear devices, many fitting difficulties result from ear dimensional changes, for example during chewing. For example some articles have reported (e.g., ten years of research and development sponsored by The National Institute on Deafness and Other Communication Disorders (NIDCD) have resulted in a better understanding of ear canal dynamics relative to jaw motion) both contraction or expansion of the ear canal volume during jaw motion. It has been reported that substantial numbers of ears have significant shape and size changes with jaw motion, that 51% of subjects have at least one ear canal in which the volume expands or contracts at least 10% with jaw opening, that 12% of subjects have at least one ear canal in which the volume contracts more than 10% with jaw opening, and only 15% of the population have both a symmetric magnitude and direction of volume change in their canals. Such volume changes cause comfort issues with fitted hearing aids and other devices fitted in the ear canal.

A sample market with associated issues is the hearing aid market. It is estimated that more than 20 million people in the United States experience some form of hearing loss. However, according to the 1990-91 National Health Survey, only 18% of those who identified themselves as having hearing problems use hearing aids (over the age of three and non-institutionalized). The reasons people who experience hearing loss but chose not to use the available technologies include: "hearing aids do not perform in noisy situations" (7.1 million), "provide too much whistle or feedback" (6.4 million), "do not work well" (4.8 million) or "work only in limited situations" (4.3 million), "have poor sound quality" (3.9 million), "break down too much" (3.4 million), "can not be used on the telephone" (3.1 million), and "negative experiences of friends" (3.9 million) (Kochkin, 1997). Custom hearing aids first use an ear mold of the user's ear canal.

Many hearing aids start with a silicon mold of the ear canal, then are scanned and placed into a computer model. The computer model serves as an ear canal. Then a hearing aid is fabricated by trimming the model to form an earmold shell smaller than the ear canal, into which electronics are placed for a hearing aid. The earmold shell provides several basic functions. First, it couples the hearing aid with the user's ear. It channels the sound from the hearing aid, through the ear canal, to the eardrum. The earmold shell also helps to secure the electronics of the hearing aid in place. The challenge is to provide the user with a secure fit (i.e., a small distance between the earmold shell and the ear canal). Yet the tighter the fit, the more uncomfortable the device is to wear. A well-fitted earmold shell directs sound from the hearing aid to the ear without feedback, thus allowing the user to hear comfortably (Lachapelle, 1999), however the tradeoff is comfort. Earmold shells are required for most hearing aids that fit within the ear canal, and since the anatomical structure of the ear varies from person to person, the majority (80%) of all earmold shells are custom-made.

Feedback (e.g., between the microphone and receiver) is an issue with hearing aids. Feedback is experienced by 6.4 million hearing aid users. There are two types of acoustic feedback: (1) produced internally from the hearing aid, indicating a need for repair; and (2) the more common cause, externally produced feedback due to leakage of amplified sound, that radiates from the speaker and then is picked up by the microphone and re-amplified. In many cases, the feedback can be addressed by either repositioning the hearing aid or by reshaping the earmold so that its fit conforms more closely to the shape of the ear canal (Smedley & Schow, 1998; Sweetow, 1998).

Feedback occurs when the hearing aid does not fit properly and the output signal leaks around the earmold, is received by the hearing aid microphone, and is amplified. Other causes of feedback include the vents that are drilled into them. Vents are used to reduce the "plugged up" feeling experienced when the user speaks. However, the vent also provides an opening for the sound to create feedback within the hearing aid. At high amplification the output signal can again be picked up by the hearing aid microphone and be amplified. Users who experience significant feedback will adjust the hearing instrument's gain, or will turn it off completely. In the worst-case situation, the hearing aid user will stop wearing the device altogether.

There is a need to improve the comfort of earmolds while maintaining the secure fit necessary for proper hearing aid function, including the reduction of acoustic feedback. Chewing, yawning, and other facial movements change the geometry of the ear canal structure. As the anatomic structure changes, the fit of the earmold is affected causing an increase in acoustic feedback. The hearing instrument may dislodge from the ear if the ear canal's shape is changed.

SUMMARY OF THE INVENTION

At least one exemplary embodiment is directed to a method of conforming a hearing aid to fit most users comprising: attaching an expandable element to a hearing aid body; and attaching an inflation management system to the expandable element, where the expandable element includes an inflatable bladder, and the inflation management system is configured to provide a medium to the bladder.

At least one exemplary embodiment is directed to a conformal hearing aid comprising: a hearing aid body, where the hearing aid body houses a microphone and a receiver, where the microphone is positioned within the hearing aid body to measure acoustic signals from an ambient environment, and where the receiver is positioned within the hearing aid body to emit acoustic signals toward a tympanic membrane of a user; an expandable element, where the expandable element is operatively connected to the hearing aid body, and where the expandable element is configured to encompass a circumferential portion of the hearing aid body when expanded; and an inflation management system, where the inflation management system is configured to expand the expandable element when actuated.

At least one exemplary embodiment is directed to a method of distributing force to increase comfort in a hearing aid comprising: attaching an inflatable system to a hearing aid; and attaching an inflation management system to the hearing aid, where the inflation management system is configured to be actuated, where the inflatable system is configured to expand to contact a portion of an ear canal when the inflation management system is actuated, and configured so that the pressure of the contact can be adjusted.

At least one exemplary embodiment is directed to a method of distributing force to increase comfort in a hearing aid comprising: actuating an inflation management system operatively attached to a hearing aid, where the actuation of the inflation management system inflates an bladder; and adjusting the pressure in the bladder to a user's comfort.

At least one exemplary embodiment is directed to an adjustable hearing aid comprising: an inflatable system operatively attached to a hearing aid; and an inflation management system operatively attached to the hearing aid, where the inflation management system is configured to be actuated, where the inflatable system is configured to expand to contact a portion of an ear canal when the inflation management system is actuated, and configured so that the pressure of the contact can be adjusted.

At least one exemplary embodiment is directed to a method of hearing aid fabrication comprising: scanning an ear mold and representing the ear mold as an ear mold computer simulation; trimming the ear mold computer simulation using software tools to generate a hearing aid simulated body; identifying at least one inflation groove on the hearing aid simulated body using software tools; and generating a modified hearing aid body simulation with the groove.

At least one exemplary embodiment is directed to a method of reducing earwax accumulation in acoustic cannels comprising: inserting an offset volume from at least one acoustic channel, where the offset volume has at least one dimension larger than the diameter of the acoustic channel; enclosing the offset volume in an enclosure, where the enclosure has an opening to the at least one acoustic channel; and making at least a portion of the enclosure from a flexible material.

At least one exemplary embodiment is directed to a wax shield comprising: a body; a stressed flexible membrane; and where the membrane is attached to the body forming a wax shield, and where the wax shield is configured to be attached to a device with an acoustic channel, where the device is configured to be inserted into an ear canal.

At least one exemplary embodiment is directed to an ear wax mitigation system comprising: a hearing aid with an acoustic channel, where one end of the acoustic channel is connected to a transducer and the opposite end is open; and a pump system, where the pump system is pneumatically connected to the acoustic channel between both ends, and where the pump system is configured to be actuated to force air into the acoustic channel to force loose ear wax out of the open end of the acoustic channel.

At least one exemplary embodiment is directed to an ear wax mitigation system comprising: a hearing aid with an acoustic channel, where one end of the acoustic channel is connected to a transducer and the opposite end is open; and a condensing portion, where the condensing portion is operatively attached to the hearing aid, where the condensing strip is selected so that cerumen gas condenses on the condensing strip before it condenses on the material of the hearing aid.

At least one exemplary embodiment is directed to a hearing aid with reduced feedback comprising: a microphone; a receiver; an inflation tube; and an inflation management system, where the microphone is configured to measure an ambient environment, where at least a portion of the ambient environment is replayed by the receiver, where the inflation tube is configured to expand to seal a channel the hearing aid is inserted into, where any feedback between the microphone and receiver is reduced as a result of the sealing of the channel by the inflation tube.

At least one exemplary embodiment is directed to a method of reducing processor power usage in hearing aids comprising: attaching at least one inflatable member to a hearing aid circumferentially; and inflating the inflatable member when the hearing aid is inserted into an ear canal, whereby the inflatable member is pressurized to a level where the acoustic path between a speaker and a microphone are reduced resulting in a reduced feedback level compared to an identical hearing aid without an inflatable member attached, where the reduced feedback reduces the amount of processor power usage needed for software treatment of feedback.

At least one exemplary embodiment is directed to a reduced power usage hearing aid comprising: an inflatable member operatively attached to a hearing aid circumferentially; and an inflation management system, where the inflation management system is configured to be actuated to pressurize the inflatable member, where when the inflatable member is pressurized the channel in which the hearing aid is inserted is sealed, where the sealing reduces the acoustic path between a speaker and a microphone in the hearing aid resulting in a reduced feedback level compared to an identical hearing aid without an inflatable member attached, where the reduced feedback reduces the amount of processor power usage needed for software treatment of feedback.

At least one exemplary embodiment is directed to a method of increasing the headroom in hearing aids comprising: attaching at least one inflatable member to a hearing aid circumferentially; and inflating the inflatable member when the hearing aid is inserted into an ear canal, whereby the inflatable member is pressurized to a level where the acoustic path between a first side of the hearing aid exposed to the ambient environment and a second side of the hearing aid inserted into a channel is reduced, where the reduced acoustic path reduces ambient environment leakage into the channel, where the reduced leakage reduces the gain to which a receiver must emit acoustic signals to a tympanic membrane of a user to achieve the threshold level of hearing for the user at a 1 kHz signal.

At least one exemplary embodiment is directed to a hearing aid that increases the receiver headroom comprising: an inflatable member operatively attached to a hearing aid circumferentially; and an inflation management system, where the inflation management system is configured to be actuated to pressurize the inflatable member, where when the inflatable member is pressurized when the hearing aid is inserted into an ear canal the acoustic path between a first side of the hearing aid exposed to the ambient environment and a second side of the hearing aid inserted into a channel is reduced, where the reduced acoustic path reduces ambient environment leakage into the channel, where the reduced leakage reduces the gain to which a receiver must emit acoustic signals to a tympanic membrane of a user to achieve the threshold level of hearing for the user at a 1 kHz signal.

At least one exemplary embodiment is directed to a wax shield comprising: a body; a stressed flexible membrane; where the membrane is attached to the body forming a wax shield, and where the wax shield is configured to be attached to a device with an acoustic channel, where the device is configured to be inserted into an ear canal.

BRIEF DESCRIPTION OF THE DRAWINGS

Exemplary embodiments of the present invention will become more fully understood from the detailed description and the accompanying drawings, wherein:

FIGS. 1 and 2 illustrate an inflation system in accordance with at least one exemplary embodiment;

FIGS. 3, 4, and 5 illustrate various cross sections of a catheter in accordance with at least one exemplary embodiment;

FIGS. 9A-9L illustrate a method for designing a hearing aid configured to accommodate an inflation tube;

FIG. 16 illustrates acoustic transparency of various materials;

FIG. 17 illustrates acoustic transparency of various stressed materials;

FIG. 18 illustrates acoustic transparency of various stressed materials;

FIG. 19 illustrates acoustic transparency of various stressed materials;

FIGS. 20-23 illustrate an earpiece in accordance with at least one exemplary embodiment;

FIG. 24 illustrates at least one exemplary embodiment using a forced pressure to remove earwax from the acoustic channel;

FIG. 25 illustrates at least one exemplary embodiment using an offset filament to keep earwax from the acoustic channel;

FIG. 26 illustrates at least one exemplary embodiment using a forced pressure to remove earwax from the acoustic channel; and FIG. 27 illustrates at least one exemplary embodiment using a condensing strip to condense earwax out of the environment onto the strip.

DETAILED DESCRIPTION OF EXEMPLARY EMBODIMENTS OF THE PRESENT INVENTION

Figure 6:
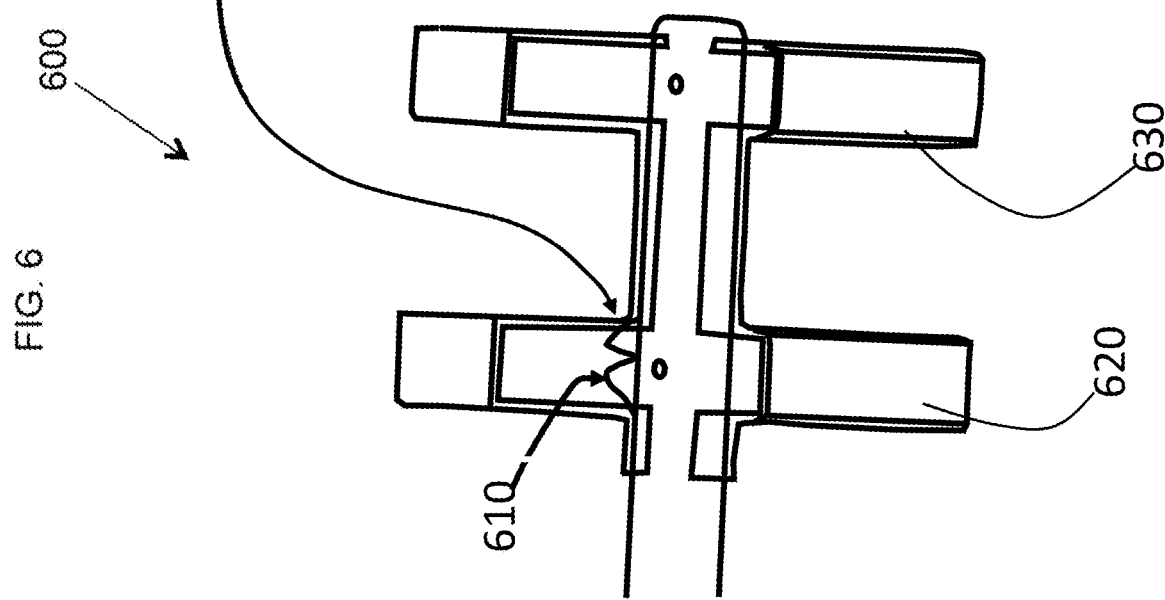
FIG. 6 illustrates the material calculation based upon elongation values.

The following description of exemplary embodiment(s) is merely illustrative in nature and is in no way intended to limit the invention, its application, or uses.

A multitude of materials can be used for exemplary embodiments, and the use of material depends upon the use the exemplary embodiment is to be used. For example a wax shield can have a lower permeability value to cerumen, but a higher permeability to air, whereas an inflation system can have a lower permeability to air than the wax shield. Additionally the permeability used as a design factor is dependent upon the objective. For example if a level of pressure loss in an inflation system is allowable over a period of time, an acceptable permeability can be determined and a material for the inflation system chosen based upon permeability. Additionally the form function of the balloon in the inflated state and the uninflated state can determine the elongation value needed. The elongation value can be used to further refine the material that can be used for the inflation system. For example some material that can satisfy permeability if the goal is to lose a few % of atm in a few hours is Polystyrene, Polyethylene, Nylon 6, Polyethylene terephthalate, Teflon™, and Evoprene™. Then selection can be made based upon elongation, for example expanding from an initial 3 mm Inner Diameter (ID1) expanding to a tube 10 mm expanded Inner Diameter (ID2), which results in a linear elongation of [2*pi*(5 mm)]/[2*pi* (1.5 mm)] of about 333%. Note that a further determination can be made based upon the hysteresis of a material of the stress strain curve. Thus a material can be chosen that has a hysteresis curve that is less during the operational ranges of temperature, and elongation %.

Exemplary embodiments are directed to or can be operatively used on various wired or wireless devices (e.g., earbuds, headphones, ear terminals, behind the ear devices or other acoustic devices as known by one of ordinary skill, and equivalents) or other devices that can be part of a user interface or inserted into an orifice (e.g., ear canal, nose, artery, vein, cavity, recess, anus, throat, pipe, chamber).

Processes, techniques, apparatus, and materials as known by one of ordinary skill in the art may not be discussed in detail but are intended to be part of the enabling description where appropriate. For example specific materials may not be listed for achieving each of the targeted properties discussed, however one of ordinary skill would be able, without undo experimentation, to determine the materials needed given the enabling disclosure herein.

Additionally exemplary embodiments are not limited to ear devices, for example some functionality can be implemented on other systems with speakers and/or microphones for example computer systems, PDAs, BlackBerry® smart phones, cell and mobile phones, and any other device that emits or measures acoustic energy but also for common items such as cups, utensils, medical inserts and devices, and pipe inserts. Additionally, exemplary embodiments can be used with digital and non-digital acoustic systems. Additionally various receivers and microphones can be used, for example MEMs transducers, diaphragm transducers, for example Knowles' FG and EG series transducers.

Notice that similar reference numerals and letters refer to similar items in the following figures, and thus once an item is defined in one figure, it may not be discussed or further defined in the following figures.

Additionally any inflatable system can include fluid (gas or liquid) as well as include a soft, flexible/expandable section to manage mandibular movement. A soft expandable medium can be used to maintain contact with the ear canal wall when the jaw moves (mandibular movement). For example a heat expansive material, light expandable, or other materials that would maintain a comfortable level of pressure, for example one that expands about 1 mm beyond the not stretch ear canal wall.

The fillable material referred to herein can be viscous and can include silicone, non or low permeable-based polymers, gels, vinyl elastomers, or any other material of sufficient properties to allow the deformation of a membrane cavity from user contact. Materials can also be used to provide a slow reformation of the original membrane cavity shape after it has been deformed and released. In this regard, a silicone, non or low permeable gel or other non-cross-linked polymer or uncatalyzed materials may be used. It should be appreciated that the composition of the fillable material could be altered for applications in which varied membrane characteristics are desired (i.e. more stiffness, durability, more or less deformability and/or longer-lasting deformation). The fillable material may be elastically deformed or it may be deformed by displacement, which is the actual movement or flow of the fillable material in response to pressure, such as that from a user's fingertips. In addition, the Tillable material could be altered for applications in which varied temperature or light conditions would be encountered during the use of particular products on which the membrane cavity is mounted.

The portion of a membrane (e.g., used for the flexible membrane) connected to a structure (base membrane) can be made of any material, rigid or elastic, including various plastic or metal materials, or it can be made of a membrane formed of thin rubber-based material, deformable plastic or silicone, non or low permeable-based materials or other elastomeric materials suitable for a given application. Note also various low permeable (to the filler medium, such as air) flexible medium can be used for balloon material. The permeability can be defined such that a pressure of 0.1 bar gauge can leak from the balloon in 8 hours. Note the pressure value can change and the time value can change. For example the pressure value can be 0.01 bar in 16 hours.

If the base is configured as a flexible membrane, the cavity can more easily conform to a product's surface, thereby increasing the ease with which the cavity can be installed, removed, and replaced. Likewise, the outer membrane also can be made of a thin rubber-based material, deformable plastic, low permeability materials, Teflon materials, silicone, non or low permeable polymer materials, or other elastomeric materials suitable for a given application. If the base membrane and outer membrane are made of silicone, non or low permeable material, both should be from 0.50 mm to 2.5 mm in thickness. In this regard, the base may be a membrane instead of a piece of rigid material. The edges of the outer membrane and the base membrane can be mechanically fastened or clamped forming the membrane cavity. Additionally, at least a portion of the base membrane can be adhesively attached (e.g., adhesive tape, glue) or mechanically fastened to the support structure.

In at least one exemplary embodiment a silicone cushion can be used in components that contact the skin, where a membrane contains a silicone filing. The silicone, non or low permeable sealant can be of an acetoxy cure type. In particular, upon exposure to moisture, the silicone, non or low permeable sealant will give off small amounts of acetic acid while the sealant cures. It is not recommended that the acetic acid vapors be inhaled. The sealant will cure in 24 hours and has a tack free time of 10-20 minutes at 77.degree. F. (25.degree. C.) with 50% relative humidity. The sealant's tensile strength is approximately 350 psi, its elongation property is 450%, and its hardness is approximately 25-30 Shore A. The sealant has temperature stability from −85.degree. F. to 450.degree. F. (−65.degree. C. to 232.degree. C.) and can withstand intermittent exposure to temperatures as high as 500.degree. F. (280.degree. C.). The sealant is believed to have good resistance to various weathering conditions, including UV radiation, rain, snow, etc., without hardening, cracking, or shrinking.

For optimum adhesion with the above adhesive, the support structure and the lower surface of the base membrane should be clean, dry, and free from oil, grease or other foreign material. If necessary, metal surfaces should be wiped with a non-oily solvent. Rubber surfaces should be abraded to promote adhesion. Depending on environmental conditions, the base and product surface should be joined within 5-10 minutes, before the tack-free time of the sealant passes.

An earpiece system can include a sealing section. At least one exemplary embodiment of the sealing section can be made disposable for performance, hygienic, and utility reasons. To minimize cerumen build up, it can be removed as much as possible before it builds up in areas of the ear canal or in the acoustic channels. This is achieved by removing cerumen while it is in a vapor stage (in the air). The sealing section of the earpiece can include material for absorbing cerumen thereby preventing buildup. In at least one exemplary embodiment, the sealing section is a balloon filled with a gas, liquid, or gel. In this particular exemplary embodiment the balloon material is designed to attract and absorb the cerumen in vapor form. Moreover, in at least one exemplary embodiment the material can prevent the cerumen from oxidizing by absorbing oxygen into the membrane or by allowing oxygen to enter the balloon but not cerumen, thus decreasing the amount of oxygen in the ear canal. Cerumen turns yellow when in contact with oxygen over an extended period of time. Non-oxidized cerumen is clear thus keeping it in the transparent state will be less noticeable on the sealing section of the earpiece when it is from the ear. In one embodiment, the material would be of one or more parts or layers, such that the low-viscosity, flowing cerumen type from the apocrine glands is trapped, and such that the high-viscosity, waxy cerumen type from the sebaceous glands is trapped, precluding either from migrating down the sound tube into the receiver electronics. The material can be located in any of the following locations, or combination thereof: over the tip of the sound port, along any portion of the inside wall of the sound port, along the exterior wall of the insertable eartip. The mechanism for trapping either or both varieties of cerumen may be any of the following: 1) to collect and harbor the cerumen on the surface of the material; 2) to act as a permeable membrane with porosity to trap the cerumen within its structure, 3) to act as a mesh filter to allow certain substances of sufficiently small unit size to flow through, put to block other substances of larger unit size (such as cerumen) by trapping it in the fabric of the mesh. The cerumen trap material provides its function via its own reaction, and thus change of state, upon insertion or soon thereafter to one of more of the ambient conditions within the ear canal, inclusive of high humidity, temperature that is near to the body core temperature (approx. 98.6 degrees F.), or TMJ movement. The material has a chemical and/or structural composition that exhibits an affinity for one or both types of cerumen. The sealing section can be replaced periodically to maintain hygiene and performance of the system. The material can be attached to the earpiece via adhesive bond, friction-fit, interlocking means, elastic means, and/or as an integral part of the earpiece that is molded into the structural material of the earpiece. Periodic replacement is one method of maintaining a clean acoustic channel Notification is provided for the end-user to know when the cerumen trap should be replaced, there is provision for the material to change color, shade, or other obvious visual attribute. The material can be affixed to the earpiece, such that it can be replaced by an end-user with no special tools or chemicals. Reducing concentration of cerumen in the ear canal area.

The gas in the ear canal when sealed by the earpiece will increase in concentration of cerumen as the body excretes the material. The cerumen eventually reaches a level of concentration where it comes out of the vapor and forms a solid in the ear canal. Circulating air into and out of the ear canal can minimize the build up of solid cerumen by reducing the vapor concentration of cerumen when replaced with gas having no cerumen. Air from the ambient can be brought into the ear canal periodically. Alternately, gas from a system for increasing/decreasing pressure in a balloon can be ported to the ear canal and a path provided out of the ear canal opened to remove gas from the ear canal thereby reducing the concentration of vaporous cerumen. Thus a material that is permeable to cerumen gas but not to or less than air can be used to allow the escape of cerumen, mimicking an open ear.

In at least one exemplary embodiment the sealing section of the earpiece can comprise an electrolysis unit for generating gas to pressurize a sealing balloon. Similarly, a manual pump can be implemented to pump up the balloon to seal the ear canal. Gas from the pressurized balloon, manual pumping, or a separate pressurized cleaning bladder can be used to blow out debris in the acoustic channels. In a cerumen cleaning process, a valve can be opened to the acoustic channels coupled to a pressurized source of gas. The force generated by the pressurized gas traversing the acoustic channel will move the debris from the opening clearing the channel. The process can be controlled by a microprocessor of the system.

In at least one exemplary embodiment a voltage/current controlled polymer can be used to cover the opening of the acoustic channels when the microphone or the receiver is not being used. The cover prevents debris from accumulating in the acoustic channel when the device is not being used. A control signal provided by the process opens the cover when either the microphone or receiver is being used.

The cover can have small opening for allowing acoustic signals to pass into the acoustic channel at all times under conditions of low activity. A pressurized gas can be used to clear the openings. The cover can be opened exposing the acoustic ports to ensure coupling to the ear canal under control of the microprocessor. The material mounted over the sound port, can be of either an impervious (imperforate) membrane which will preclude any passage of earwax but will be excited by incident sound waves and pass them, in the same manner as a drum head, or a porous membrane whose passages are smaller than the smallest unit of cerumen so that the cerumen will be held in the membrane, but which allows air molecules to pass through, thus passing sound wave energy. The former (impervious membrane) solution will also preclude the passage of ear canal perspiration and other liquids. The cover can also be a trap for the cerumen to be contained in the cover. The cover does not pass sound in this example and is opened to expose the acoustic channel when the earpiece is operational.

In at least one exemplary embodiment a voltage/current controlled polymer can be used to clean debris from the acoustic channel. The polymer can be designed to physically move from one position to another position. For example, the polymer can reside in the acoustic channel in one state and extend out of the acoustic channel in a second state thereby pushing debris out of the tube. The polymer can sweep the ports of the acoustic channel similar to a windshield wiper. The polymer in a first state resides on one side of the stent port and sweeps across the openings to a second side of the stent ports. The polymer can be designed to create a sweeping motion internal to the acoustic channel where multiple polymer fingers are used in sequence to make the sweeping motion moving debris from internal to the channel towards the port and then out of the port.

In at least one exemplary embodiment protrusions on the stent through which the acoustic channels travel to create areas away from the ports as collection points for cerumen. For example, multiple protrusions at the tip where the ports are located. Cerumen is likely to be collected on these extensions. The extensions do not affect receiving or providing an acoustic signal. Forced gas through the acoustic tube can clean off the extensions. Tip or port shape of the acoustic channel can impact how the gas is concentrated to remove debris.

At least one exemplary embodiment is directed to at least one of: 1.) a pressurized sealing section that blows out debris in or around an acoustic channel; 2.) electrolysis to generate a gas; 3.) a manual pump to inflate a sealing section, a restoring force balloon, an extra reservoir for cleaning; 4.) an elastic or inelastic balloon; 5.) a current/voltage controlled polymer; 6.) an acoustic channel cover; 7.) a polymer acoustic channel cleaner (sweeping movement inside tubes); 8.) a perforated cover to let sound in; 9.) valving to blow out an acoustic channel; 10.) detection methodology of a blockage possible using a high frequency signal (could go to a frequency above human hearing if a transducer will allow); 11.) a material of a balloon or somewhere on the earpiece that attracts or is permeable to cerumen (can be a one way membrane); or 12.) if a balloon is liquid filled it could contain a substance that dissolves cerumen, is antibacterial, and lubricates the ear canal wall such as a cyclodextrin.

Note that there are several advantages of the inflation system. 1.) The IMS (inflation management system) mitigates repeated need to take new impressions for poor fitting. The same is true for weight loss (change) of the wearer. One size fits many. 2.) Utilizing an inflated membrane around the circumference or down path around a partial or whole assembly (except where the sound would emanate out of) would reduce significantly the need for adaptive feedback control (AFC). 3.) An IMS can enhance comfort. 4.) An IMS can be used for stability in the ear, thus the reduction of loss of instruments as the ear is moved. 5.) The IMS has been tested and reduces the occlusion effect. 6.) An IMS can produce better comfort, stability, and acoustical satisfaction, which governs overall enhancement of user compliancy. 7.) An IMS can reduce total power of the processor since AFC has been reduced. This can extend battery life. 8.) Increase in available gain before feedback sets in, improving the voice intelligibility for the wearer. As well, improving the ambient field so the wearer has better situation awareness. 9.) Reduction of possible trauma during head inquiry from balloon "absorbing" shock and impact rather than the hearing aid migrating down the acoustical pathway. 10.) If used with an ECM, a more natural voice of a listener due to reductions of the occlusion effect. If broadcasted to others, a more natural voice to the receipt. 11.) Increase of speech intelligibility based on reduction of voice resonance.

Exemplary Embodiments

Note that many of the sizes of the devices can vary so that a device can be about multiple mm in diameters, and multiple mm in length, with a mass varying from 0.5 gram to hundreds of grams. For example sealing sections (e.g., hoop balloons used for the circumference in hearing aid fabrication) can be in the minimal compressed dimension to the hearing aid dimension (e.g., 8 mm diameter) and an expanded dimension (e.g., 14 mm) needed to seal the hearing aid.

Exemplary embodiments of the present invention will become more fully understood from the detailed description and the accompanying drawings, wherein:

FIGS. 1 and 2 illustrate multiple balloons in at least one inflation system in accordance with at least one exemplary embodiment. The exemplary embodiment of the inflation system illustrated can include a catheter 200 of length L1 (e.g., 10-40 mm), and outside diameter OD. In the particular non-limiting example illustrated a balloon (e.g., multi-chamber) can be attached to the catheter (e.g., bonded, adhered, glued, thermal bonded, molded, ultrasonic bonding). The balloon can be inflated via inflation holes 100 to inflate separate multi-chambers of the balloon. The balloons can be inflated separately or simultaneously. The balloon can expand to an outer radii L5 (e.g., 3-8 mm), with an axial extent along the axis per chamber, L6 (e.g., 1-15 mm), with the chambers separated by a gap of L2 with midline separations of L3 (e.g., 1-20 mm). Where the thickness of the balloon dt can be varied (e.g., 0.005-2.0 mm). Note that the balloon can be made of various materials. For example a balloon can be made of a material that has low permeability to the medium that is within the balloon. For example if the medium in the balloon is air, and the design criteria is that the balloon retains pressure for a period of time, such design criteria will guide which flexible material to use. For example some material that can satisfy permeability if the goal is to lose a few % of atm in a few hours is Polystyrene, Polyethylene, Nylon 6, Polyethylene terephthalate, Teflon™, and Evoprene™.

FIGS. 3, 4, and 5 illustrate various cross sections of a catheter/stent in accordance with at least one exemplary embodiment. Note that the catheter/stents can be made of the same material as the balloons. The catheters (e.g., 400, 500) are attached to the single or multiple balloons 410, where multiple channels (e.g., 330, 510, 520) can be embedded in the catheter 500. The multiple channels can be chosen so that each channel can inflate a separate balloon to different pressures. For example pressures can be chosen for comfort levels and/or sound isolation levels. For example gauge pressure values inside the balloons can be between 0.001 bar and 2.0 bar. The multiple channels can be used as various use channels, for example acoustic channels or pneumatic channels. Note that the catheter 500 can be flexible along its long axis so that it can bend around several corners (e.g., traversing an ear canal) but be firm enough to facilitate insertion (e.g., Shore Durometer 30-70).

FIG. 6 illustrates the material calculation based upon elongation values for another exemplary embodiment of an inflation system 600. Depending upon the elongation % of the material an extra amount of material 610 can be used to facilitate the reduction of permanent deformation of the multiple chambers (e.g., 620, 630) of the balloon. A simple linear elongation % calculation is illustrated and can be used to calculate a rough extent of any extra material needed (L0 minus bonding distance). The linear calculation is a non-limiting example and more detailed analysis can be used to determine an ideal length. For example an area and volume of the material can be used, and the critical elongation before permanent deformation occurs can be used to design the L0 value.

Figure 7:
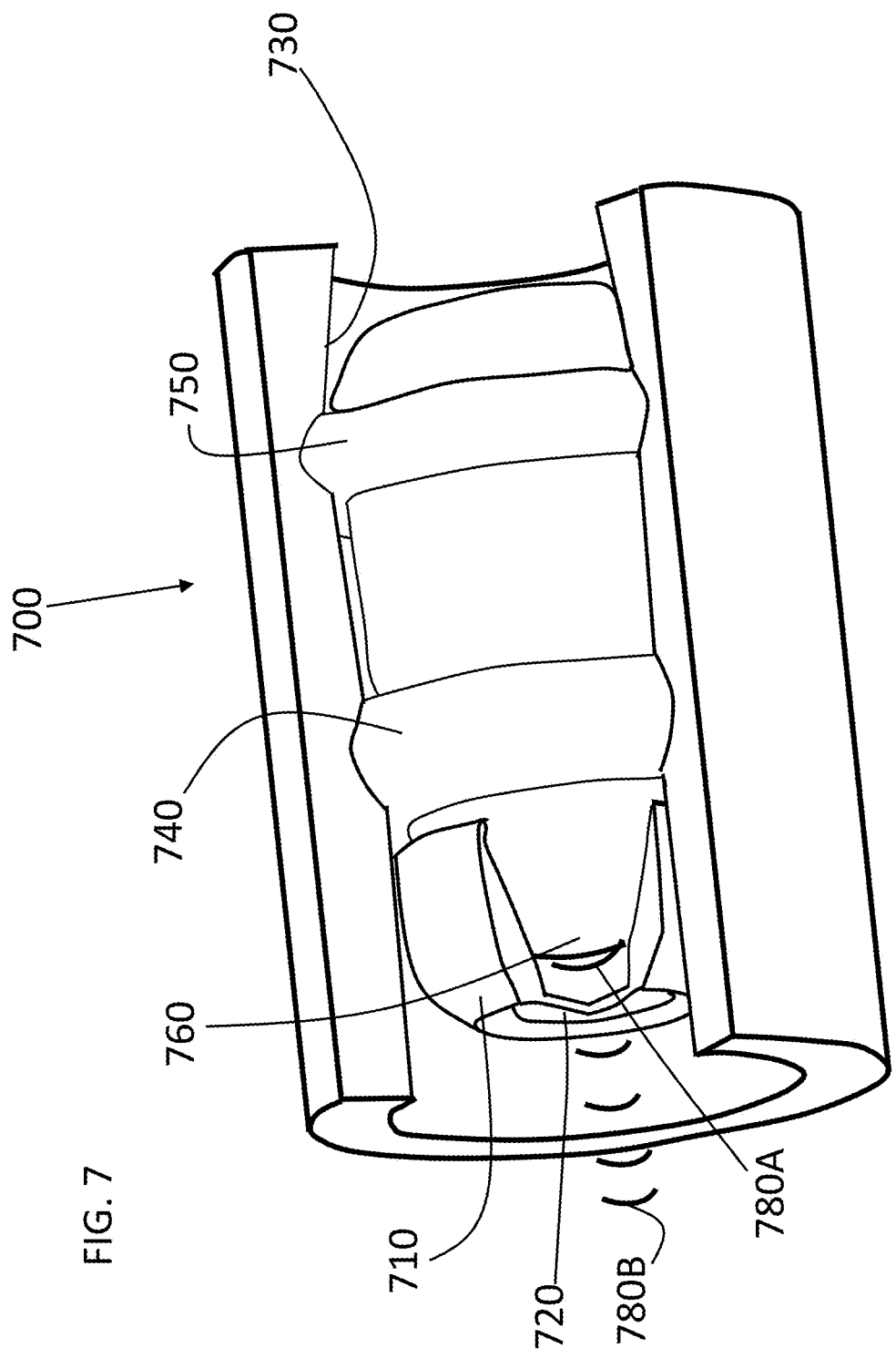
FIG. 7 illustrates an insertion device with at least one inflation tube to seal a channel that the insertion device is inserted in accordance with at least one exemplary embodiment.

FIG. 7 illustrates an insertion device 700 with at least one inflation tube (e.g., 740, 750) to seal a channel (e.g., 730) that the insertion device is inserted in accordance with at least one exemplary embodiment. As illustrated a body 770 can have grooves for inflation tube inserts. An optional wax shield 710 can be operatively attached (glued, bonded, thermal bonded, ultrasonic bonding, molded) to the body 770. The wax shield 710 can have a portion 720 that is a flexible membrane that is acoustically transparent (for example the acoustic energy 780A to 780B, via acoustic port 760). The flexible membrane 720 can be a material that has a low permeability to cerumen gas and is acoustically transparent. Although it can be impermeable to cerumen gas and then stressed to a design % to facilitate acoustic transparency but serve as a shield to prevent cerumen gas from entering the acoustic channel.

Figure 8:
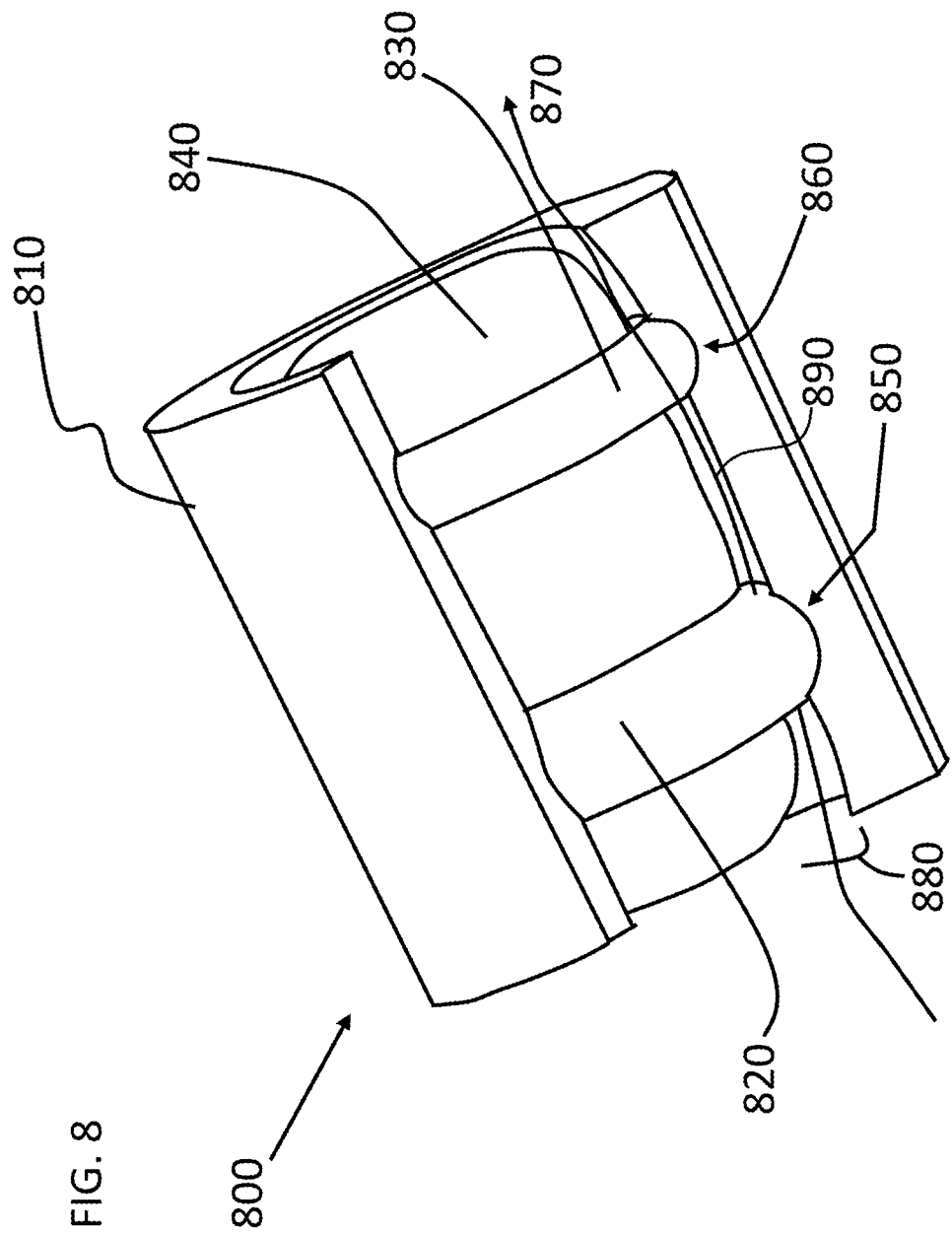
FIG. 8 illustrates an insertion device with at least one inflation tube to seal a channel that the insertion device is inserted in accordance with at least one exemplary embodiment.

FIG. 8 illustrates an insertion device 800 with at least one inflation tube (e.g., 820, 830) to seal (e.g., reduction of acoustic energy 880 to energy 890 to energy 870) a channel (e.g., 810) that the insertion device 800 is inserted in accordance with at least one exemplary embodiment. In this non-limiting example one side of the insertion device 800 can be partially acoustically isolated from the opposite side. For example the insertion body 840 can have one side in an ear canal where a receiver emits acoustic energy toward the ear canal, where the receiver (e.g., due to the inflation tubes 820, 830) can be acoustically isolated by a microphone on the side of the insertion device 800 on the ear aperture side of the insertion device 800. Such acoustic isolation aids the reduction of feedback between the microphone and the receiver, for example in a hearing aid. For example an acoustic signal from the aperture side (proximate to energy 880) can be acoustically reduced to energy 890 and to energy 870, while passing the inflation tubes 820 and 830 which press against the channel 810, at positions 850 and 860 respectively.

Figures 9A, 9B, 9C, 9D:
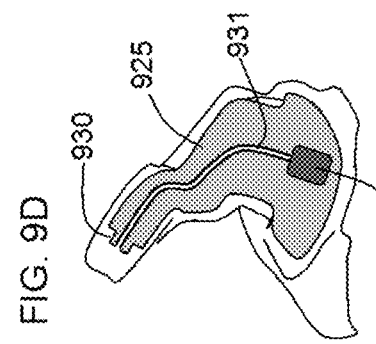
Figures 9E, 9F, 9G, 9H:
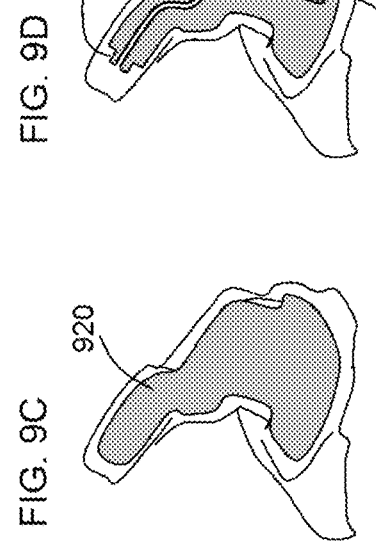

FIGS. 9A-9H illustrate a method for designing a hearing aid configured to accommodate an inflation tube. Note that any type of hearing aid (e.g., Completely In Canal, CIC) can use methods of exemplary embodiments. FIG. 9A illustrates an ear mold 900, which can be 3-D scanned and placed into a computer model as a virtual representation 910 of the ear mold (FIG. 9B). The ear mold can be via a silicon impression material or optically scanned. The virtual representation 910 can be further reduced using software tools (e.g., a person (e.g., designer) can utilize a mouse to click on portions of the virtual representation 910 in a software CAD system) to create a reduced version 920 (FIG. 9C) inside the virtual representation 910, where the virtual representation can be used as a virtual ear canal. For example a software tool can be constructed so that a given distance normal to the virtual representation can be constructed forming the reduced version 920.

The reduced version 920 can form the basis of a body of an earpiece such as a hearing aid. A designer can select (e.g., via clicking the button on a mouse) portions of the reduced version 920 that are further removed to accommodate further structures (e.g., male connecting portion 930 to a wax shield 940 (FIG. 9E), acoustic channels 931 to a receiver 932) in a modified version 925 (FIG. 9D). The designer can further select inflation grooves (e.g., 950, 960) and support inflation channels (e.g., 970), which can then be removed (e.g., manually indicating the section to remove or programmed to remove a set amount for standardized inflation tubes) (e.g., grooves removed 955, 965 and 975 from the computer model) from the modified version 925 forming a grooved model 927. The grooved model 927 can then be fabricated (e.g., molded, CNC, SLA) to form the body of the hearing aid and inflation tubes and inflation lines attached onto the body of the hearing aid. Then a pumping mechanism 987 (e.g., manual, electrolysis) can be attached to the inflation tubes 957, 967 and 977.

FIGS. 9I through 9K illustrate several versions of earpieces that can use the inflation management system whose fabrication is illustrated in FIGS. 9A-9H. In addition to a receiver (i.e., a speaker) 932 (coupled to acoustic channel 933), a microphone 951 (coupled to acoustic channel 937) can be included. Both the receiver 932 and the microphone 951 can be operatively attached to a circuit 941. The circuit 941 can include a processor chip or can be a circuit that is configured to modify (e.g., amplify) the acoustic signal measured by the microphone 951 and emit the modified acoustic signal from the receiver 932. For example the microphone 951 can pick up the ambient environment and emit it via the receiver 932 amplified, enhancing a user's hearing. Note that many microphones and receivers can be used herein in the exemplary embodiments described (e.g., Knowles TWFK receivers, FG microphones) and the discussion herein is not meant to limit which microphone or receiver is used in the exemplary embodiments.

FIG. 9J illustrates the use of a microphone 952 to pick up acoustic signals from the same region that receiver 932 emits them. For example an earpiece can be configured to use a microphone 952 to pick up voice through the head, and operatively connected to a circuit 941, transmit the picked up voice remotely. An inflation system can enhance the quality of the voice pickup by reducing the occlusion effect, resulting in a clearer voice quality (e.g., one with reduced resonance in the closed region near the ear drum).

FIG. 9K illustrates the use of two microphones (e.g., microphones 952 and 951), where one microphone (951) monitors the ambient environment and the second microphone (952) the environment in the ear. Such a configuration can be used for communication in noisy environments, where the inflation system provides mitigation of the occlusion effect, enhancing voice pickup by microphone 952, which can then be sent via communication pathways (e.g., CDMA, RF) to another party. In a low noise environment the voice pickup by microphone 951 can be sent. Note that circuit 941 can be a DSP chip, a simple circuit board with preamps, or other earpiece related circuit that can modify any received acoustic signal.

FIG. 9L illustrates an example of a shell 971 that can be CAD reduced from virtual representation 910. The shell can contain the contents of a hearing aid. The shell can be sent to an SLA machine for fabrication or other manufacturing system that can generate the shell from the CAD drawing.

Figure 10:
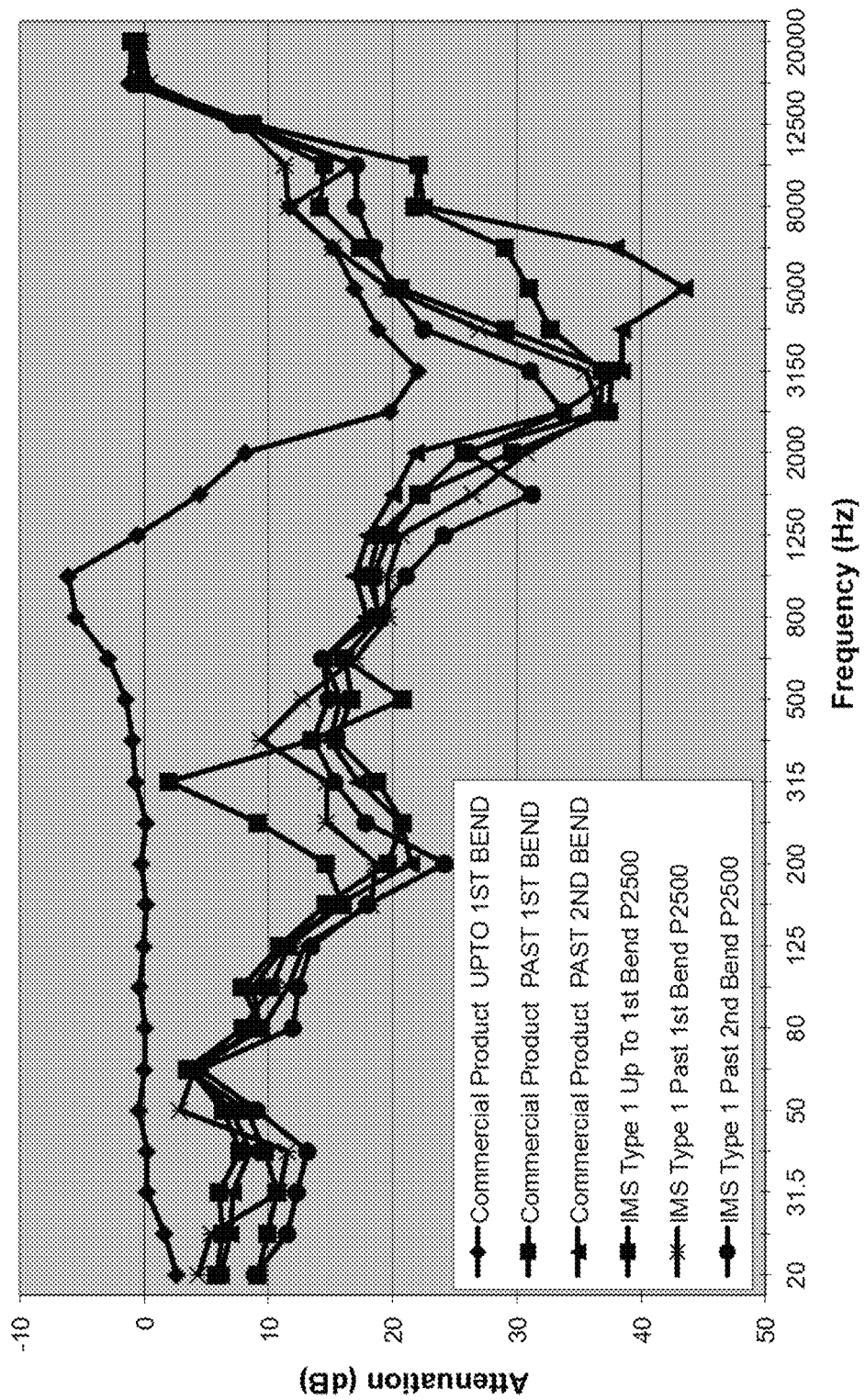
FIG. 10 illustrates the effect of insertion depth on insertion loss for a first commercial product versus an inflation system in accordance with at least one exemplary embodiment.
Figure 11:
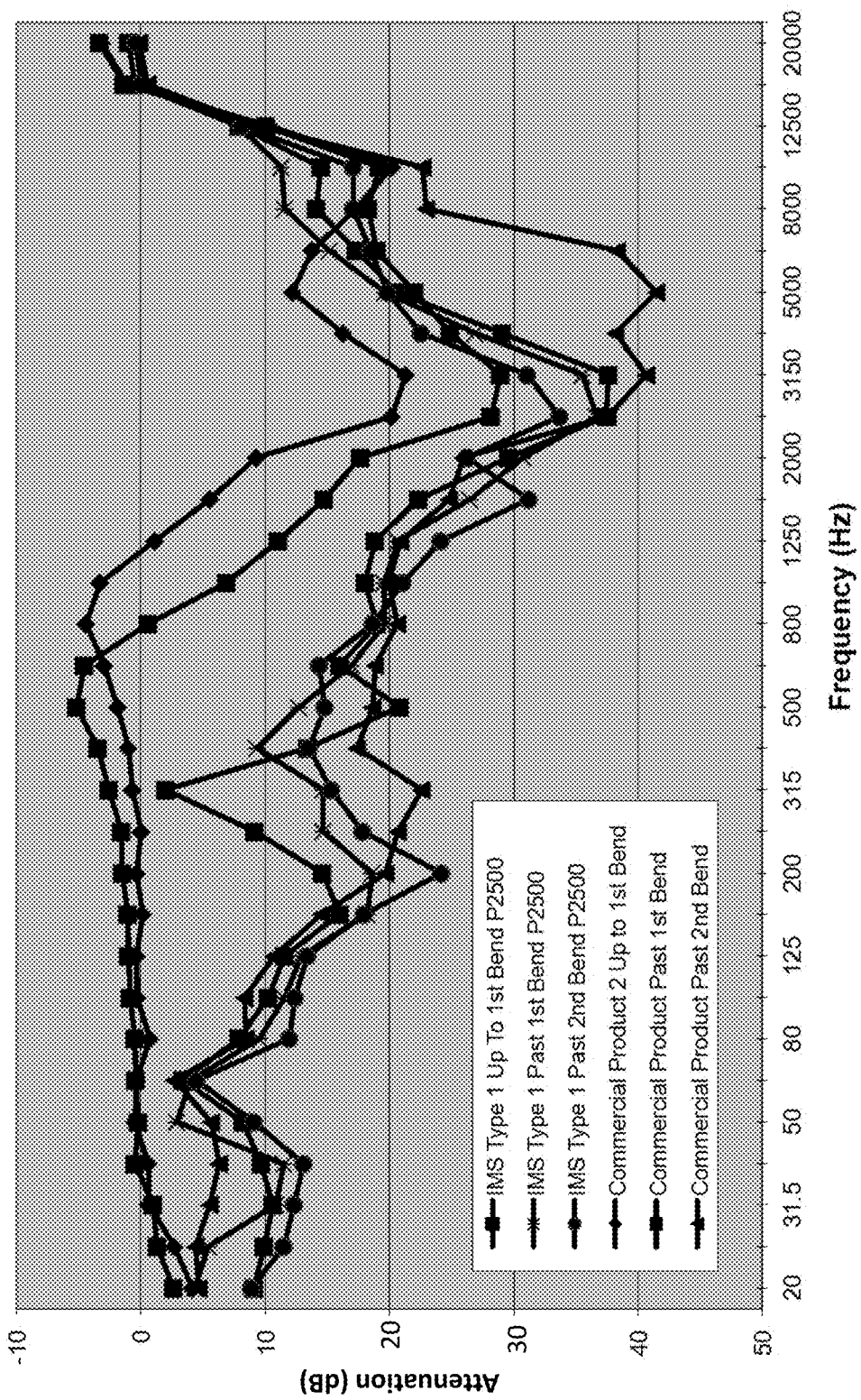
FIG. 11 illustrates the effect of insertion depth on insertion loss for a second commercial product versus an inflation system in accordance with at least one exemplary embodiment.

FIGS. 10 and 11 illustrate the effect of insertion depth on insertion loss for a commercial product versus an inflation system in accordance with at least one exemplary embodiment. As illustrated a commercial hearing protection device's effectiveness is strongly determinant upon the insertion depth. Many devices (e.g., foam plugs) are not inserted past the 2nd bend of an ear canal. One advantage of the inflation management system (IMS, balloon, catheter) in accordance with at least one exemplary embodiment is that insertion effectiveness and depth can be repeated consistently. For example FIG. 11 illustrates a commercial foam plug (Commercial Product 2), compared to an inflation management system (IMS) type 1, note the much smaller spread as a function of frequency of the IMS system as a function of insertion depth compared with the commercial product. Thus the IMS system performs more consistently than the commercial product tested.

Figure 12:
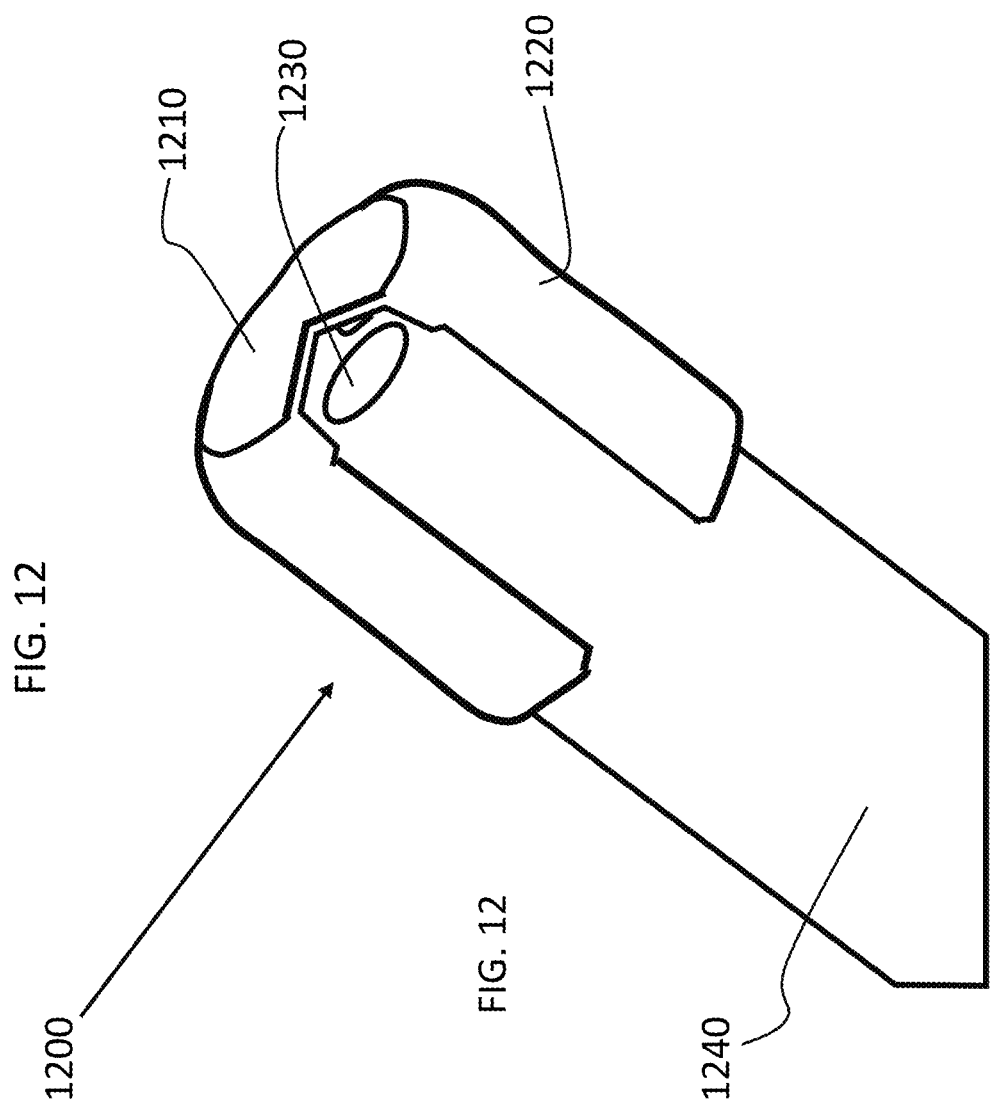
FIG. 12 illustrates a wax shield in accordance with at least one exemplary embodiment.

FIG. 12 illustrates a cut away of a wax shield 1200 in accordance with at least one exemplary embodiment. A catheter 1240 with channels 1230 (e.g. acoustic channel) is illustrated. In some circumstances when the catheter 1240 is placed in an environment (ear canal) a medium (e.g., earwax) in the environment can clog the channel 1230. To avoid the medium from entering and clogging the channel 1230 a shield (e.g., waxshield) can be attached to the end of the catheter 1240. The waxshield can include a body 1220 and a membrane portion 1210. If acoustic signals are played from the acoustic channel 1230, they can be damped by the membrane portion 1210. The acoustic transparency of the membrane can be modified based upon material, thickness, and stress of the membrane. In at least one exemplary embodiment the membrane is made to have a low permeability to ear wax both in its liquid, solid, and gaseous form. In at least one exemplary embodiment there is an offset distance between the membrane and the end of the catheter. In at least one exemplary embodiment the diameter of the membrane is larger than the cross sectional diameter of the channel 1230. The waxshield can be operatively attached to the catheter 1240 (e.g., bonded, molded, glued, adhered, thermal bonded, ultrasonic welded). In at least one exemplary embodiment the waxshield is stressed to a design elongation, where the elongation is chosen to maximize acoustic transmission through the membrane. For example a highly stressed membrane (e.g., 100% or more) is less acoustically transparent, but if the same membrane is stressed to a lower amount (e.g. non-zero, 20-70%) the membrane can become more acoustically transparent than even a nonstressed membrane. Note that the membrane can be fabricated from materials similar to the balloons, or even air permeable materials like silicon, or rubber.

Figure 13:
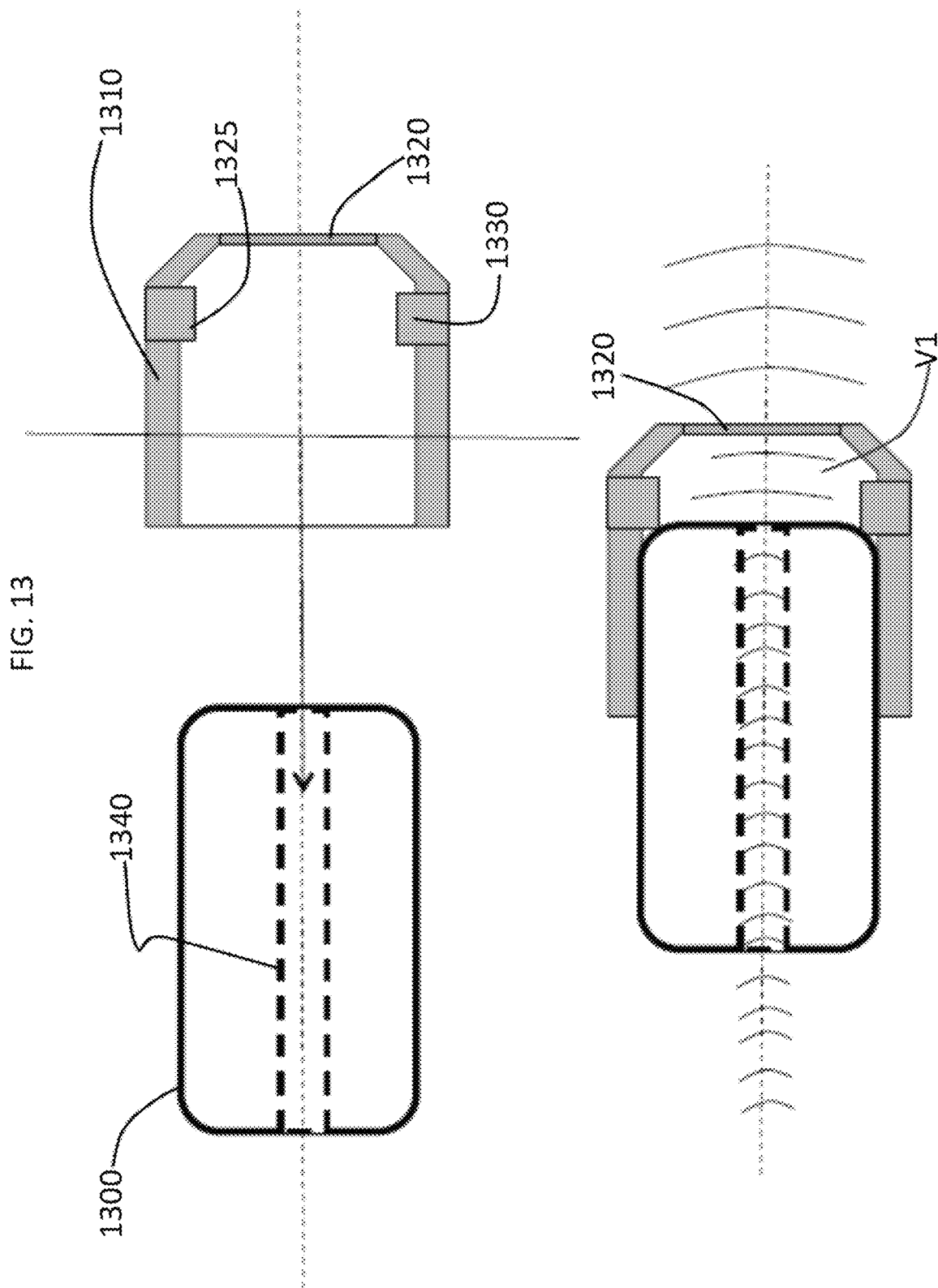
FIG. 13 illustrates the attachment of a wax shield to an acoustic device in accordance with at least one exemplary embodiment.

FIG. 13 illustrates the attachment of the waxshield to an acoustic device in accordance with at least one exemplary embodiment. In the exemplary embodiment illustrated a stop 1325 is built into the waxshield so that an offset volume of V1 is created when the waxshield is attached. A catheter 1300 having an acoustic channel 1340 can be attached (A) to the waxshield, for example via bonding (e.g., glue, adhesive, UV cured, molded together). The waxshield can have a sleeve 1310, a stop 1325, and a stressed membrane 1320.

Note that in at least one exemplary embodiment the stressed membrane is placed directly over the port of the acoustic channel 1340, without an offset volume V1.

Figure 14:
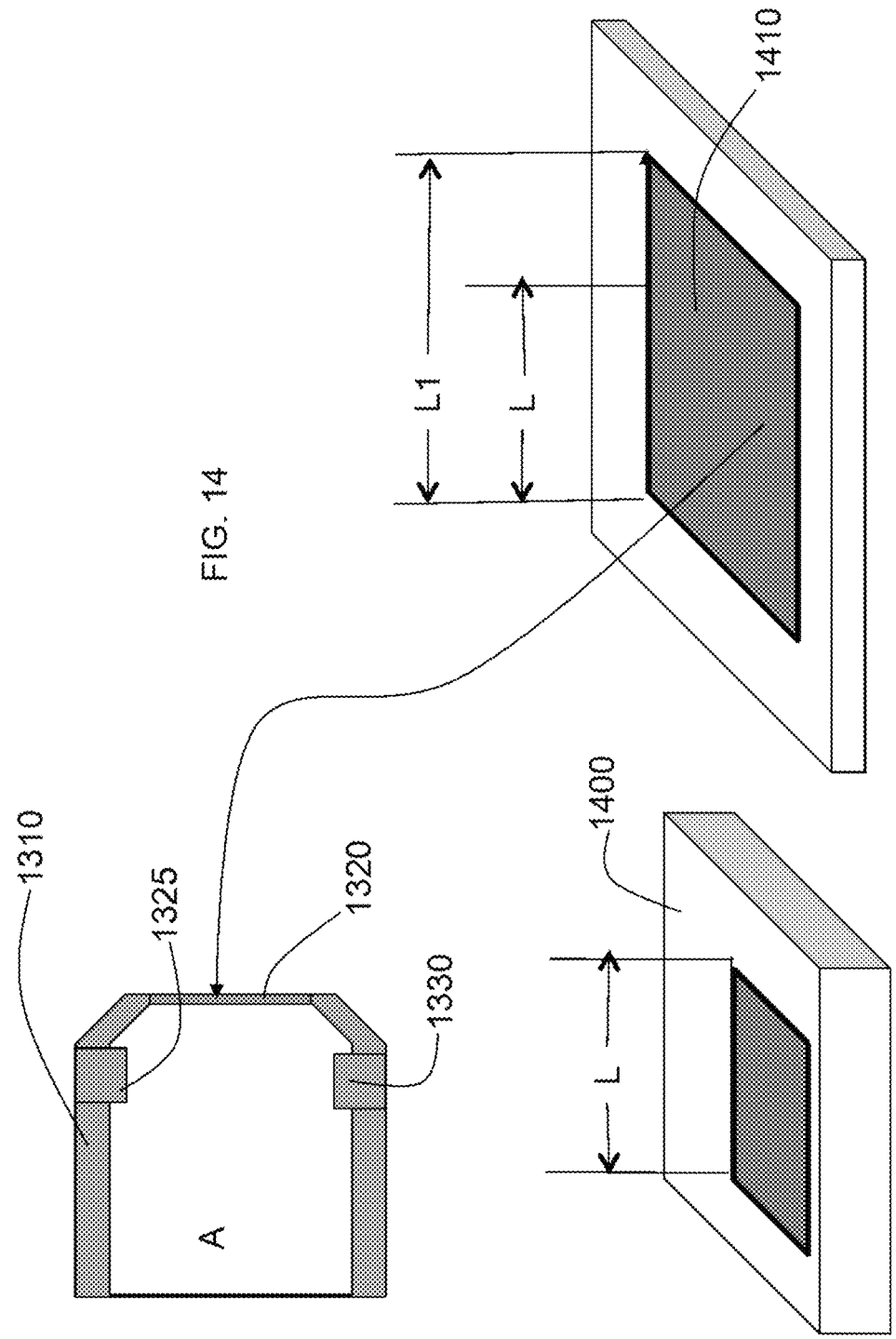
FIG. 14 illustrates a method of stressing a membrane before attachment to a wax shield in accordance with at least one exemplary embodiment.

FIG. 14 illustrates a method of stressing a membrane 1320 before attachment to a waxshield in accordance with at least one exemplary embodiment. For example an initial membrane 1400 can be elongated 1410 prior to attachment to the waxshield body. The optimum elongation % is dependent on membrane material, membrane unstressed thickness, and area extent. Note that for a given thickness the flexibility of the membrane or the ability to propagate acoustical signals can vary as the stress is increased since as the membrane is stressed the thickness decreases. Thus if the thickness effects are larger than the damping effect due to membrane stress, the membrane can be more flexible and transmit acoustical signals better than when unstressed. One can calculate the elongation amount by several methods of which at least one will be explained. The unstressed membrane has a volume V. An area A then gives a thickness of t=V/A. If the membrane is stressed (e.g., area A increased to A1 where A1>A) then the new thickness t1 is t1=V/A1. The % of strain increase (referred here as elongation) can be expressed as the change in a dimension (e.g., length, thickness), area change (e.g., A1/A), and volume change in the effective region (the areal portion used across an acoustic port, e.g., the area covering 1320). The strain (change in area, length, volume) and/or stress (force/area perpendicular to force) can be related to acoustic transparency. FIGS. 15-19 illustrate the various levels of acoustic transparency as a function of elongation versus material, where in these non-limiting examples the elongation % is a linear variation. For example if the initial length is 10 mm then stretching of the membrane in one dimension to 12 mm constitutes an elongation % of 20%, thus as plotted in FIG. 19 would relate to an X=20 value.

Figure 15:
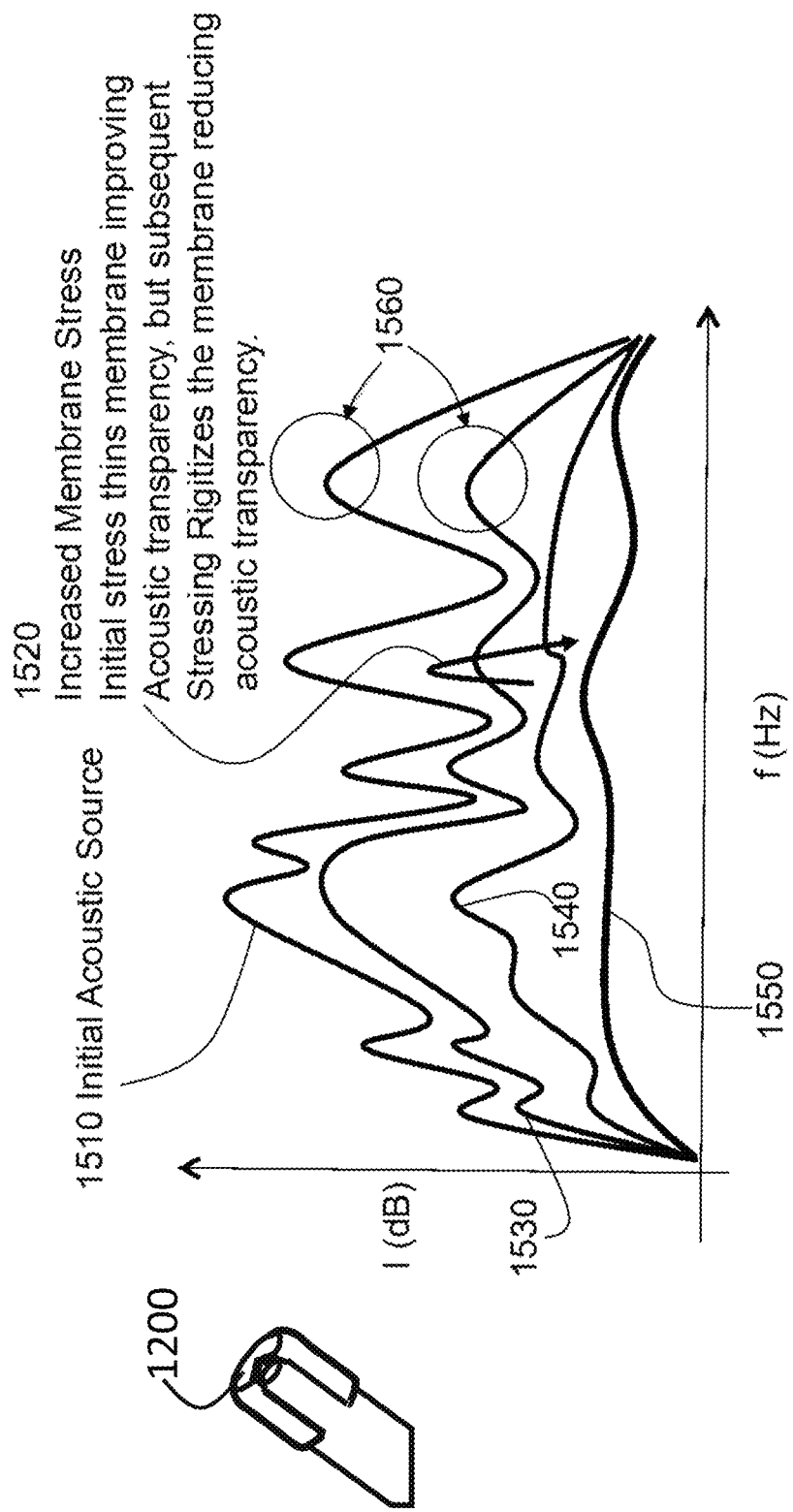
FIG. 15 illustrates acoustic transparency of a wax shield in accordance with the stressed state of a membrane built into a wax shield.

FIG. 15 illustrates acoustic transparency of a waxshield in accordance with the stressed state of a membrane built into a waxshield. Note that features in the initial acoustic source 1510 are repeated in some of the stressed membrane plots (e.g., 1560). What is illustrated in FIG. 15 as the initial acoustic source 1510 is the spectrum of the initial source as measured by a microphone at a given location without a membrane in place. Then various membranes that have been stressed to various values are inserted between the source signal (e.g., receiver) and the measuring microphone. 1540 illustrates the spectrum passing an unstressed membrane. Note that an unstressed membrane 1540 can have a larger gap (i.e. decreased intensity as a function of frequency) between the source 1510 than a stressed membrane 1530, thus some of the features in the initial acoustic source 1510 have been removed (e.g., 1560). Larger stresses can decrease the acoustic transport through the membrane, for example a larger stress 1550 rigidizes the membrane making the membrane acoustically reflective. Thus 1520 the gap between the source and the sound making it through a stressed membrane is first reduced as the stress increases (e.g., via thinning the membrane while not appreciably restricting the motion of the membrane). Thus a wax shield membrane 1200 can be placed above an acoustic port. There can also be an offset distance between the acoustic port. This allows the membrane area to be larger than the acoustic port exit area and thus facilitates acoustic sensitivity by allowing the membrane surface to vibrate more freely if the acoustic exit area is small. For example since the vibration stroke of the membrane communicates acoustic pressure a smaller confined area limits the modes of vibration's amplitudes, effecting the amplitude that can be communicated as a function of frequency.

FIG. 16 illustrates acoustic transparency of various unstressed materials (1610, 1620, 1630, 1640, and 1650) that can be used for the membrane in the waxshield. The material showing little deviation from 1600 (the unstressed acoustic source) is the material with the best acoustical transparency.

FIG. 17 illustrates acoustic transparency of various stressed materials that can be used for the membrane in the waxshield. FIG. 17 illustrates the same material as illustrated in FIG. 16 for a particular elongation % (X). FIG. 17 illustrates a method of choosing between a series of materials, by choosing the material whose frequency spectrum is closest to the source signal. For example one can choose the spectrum with best least squares fit to the source signal.

FIG. 18 illustrates acoustic transparency of one material at various stresses for a closed cavity experiment, illustrating that various stresses can be acoustically more transparent than other stress values. Note that the stress can have an elongation value from 0% up to 2000%. As clearly illustrated various levels of elongation have higher values of acoustic transmission than an unstressed state. Thus once a material is selected, FIG. 18 illustrates a method of choosing the optimum stress for the material. For example an elongation X % would be chosen over (100+X) % since an elongation of X % provides more acoustical energy transmission than in the unstressed state or (100+X) % state.

FIG. 19 illustrates acoustic transparency of one material at various stresses for an open cavity experiment, illustrating that various stresses can be acoustically more transparent than other stress values. Note that the stress can have an elongation value from 0% up to 2000%. As clearly illustrated various levels of elongation have higher values of acoustic transmission than an unstressed state. Thus once a material is selected, FIG. 19 illustrates a method of choosing the optimum stress for the material. For example an elongation X % would be chosen over (100+X) % since an elongation of X % provides more acoustical energy transmission than in the unstressed state or (100+X) % state.

FIGS. 20-23 illustrate non-limiting examples of earpieces 2000 in accordance with at least one exemplary embodiment. As illustrated, a housing 2050 (e.g., housing electrical components such as Knowles FG, TO microphones 2110 and TWFK receivers 2120 (for example coupled to circuit board 2140)), can be operatively connected to a grip 2040 which interfaces, for example via body portion 2030, the electrical components to a multilumen stent 2010 that can have multiple acoustic channels (e.g., 2220 and 2230). The stent 2010 can have attached an inflatable element 2020. Note that an additional ambient environment microphone 2130 (e.g., a MEMs microphone) can monitor the ambient environment. Note that the inflatable element 2020 can be inflated via an inflation port 2210 connected to one of the multilumens that can be sealed at one end and connected to a pump system at the other to inflate the inflatable element 2020. FIG. 23 illustrates another exemplary embodiment, where an elastic membrane 2310 can provide a restoring force B2, which causes expansion B1 of the inflatable element. When the inflatable element is compressed A1 then the elastic membrane is expanded A2. The earpieces illustrated in FIGS. 20-23 can have wax shields at the end of the stent 2010 as described previously. FIGS. 24-27 illustrate further non-limiting examples of ear wax mitigation. In general FIGS. 24 and 26 illustrate a forced air method of clearing the acoustic channels, FIG. 25 illustrates filaments to keep ear wax away from acoustic channels, and FIG. 27 illustrates a condensing strip to condense the ear wax at a controlled location away from the acoustic ports.

FIGS. 24 and 26 illustrate a forced air method of clearing acoustic channels. For example a user controlled push button bladder can be connected to an earpiece so that forced air 2460 travels down a pneumatic channel which can be made a one way flow via one-way pressure valves (e.g., 2450, 2450A, 24508, 2450C, and 2450D). Thus the pressure of the forced flow 2460 can push air through acoustic channels 2430 and 2440, which can be respectively coupled to transducers 2410 and 2420. Ear wax 2470 that has entered one of the acoustic channels (e.g., 2430) can be removed 2490 via the forced air. FIG. 26 illustrates a configuration where two one way valves (e.g., 2450C and 2450D) allow a built up of pressure in the acoustic channels (e.g., 2430 and 2440) forcing the ear wax 2470 from the obstructed channel when the pressure builds up to the point where the force on the ear wax 2470 is such to dislodge it from the acoustic channel (e.g., 2430). Note that 2400 can be a stent with the multilumen channels acting as acoustic channels 2430 and 2440. Note the valves 2450, 2450A, 24508, 2450C, and 2450D can be different types of valves, for example 2450, 2450C and 2450D can be duckbill valves, while 2450A and 24508 can be unique membrane one way valves.

FIG. 25 illustrates a multilumen stent 2500, where two of the lumens are acoustic channels 2430 and 2440. Optional one way valves (e.g., 2450A, 24508) can be added to reduce ear wax from entering any of the acoustic channels. This method is independent of filaments 2580. Valves 2450A and 24508 can be very thin membrane valves that essentially allow a pressure wave to pass the valve in essentially one direction. For example a one way membrane acoustic valve can be a membrane composed of tiny (e.g., <1 mm OD) conical structures with openings that are closed with no pressure difference between the sides of the cone. Upon impingement of the back of a cone the pressure forces open the flexible cone allowing the pressure to pass through, whereas a similar pressure incident on the point side of the cone forces the closing of the opening reflecting a large portion (e.g., >50%) of the acoustic energy. The filaments 2580 can be used independent of any valves in at least one exemplary embodiment and can be composed of any material that will offset earwax 2470 away from the acoustic channel opening (e.g., Teflon, silicon, low durometer plastics and polymers).

FIG. 27 illustrates at least one further ear wax mitigation device 2700 in accordance with at least one exemplary embodiment. The device 2700 can include in general an inflation element 2730, a low ear wax gas condensing portion 2720 (e.g., stent, portion of tip) and a larger ear wax condensing portion 2710 (i.e., higher condensing when compared to 2720). In general gas condenses onto an object when the condensation point of the gas is reached, which is a function of temperature. Thus when water vapor saturated air at a particular temperature comes into contact with a cooler material the air at the interface decreases in temperature condensing the water as droplets until the new saturation level for the new temperature is reached. For ear wax mitigation, removing the ear wax gas from the environment facilitates keeping it out of acoustic channels. Thus if the acoustic channels can be kept near or higher than body temperatures (e.g., material made of a good heat conductive material so that the earpiece low condensing regions achieve body temperature quickly), then isolated regions of cooler temperatures can condense out a portion of the ear wax gas in the closed region between an occluding earpiece and the tympanic membrane. For example if the balloon and stent are made of a good thermal conductive polymer, while a light color (e.g., to keep the temperature of the strip down, the light color reflects most incident light) strip of low conductive material is attached, then the ear wax gas will have a tendency to condense on the light strip of non conductive material, removing the ear wax gas concentration from the air. If the light colored strip is made to be easily cleanable then a user can clean the earpiece themselves.

At least one exemplary embodiment is directed to a method of reducing earwax accumulation of acoustic cannels comprising: inserting an offset volume from at least one acoustic channel, where the offset volume has at least one dimension larger than the diameter of the acoustic channel (e.g., if the acoustic channel has an inner diameter of 1 mm the offset volume has an inner diameter of about 2.5 mm); enclosing the offset volume in an enclosure (e.g., molding the waxshield as one piece with an offset ridge and membrane, where the waxshield can be attached), where the enclosure has an opening to the at least one acoustic channel (e.g., opening in the waxshield can be fit over an acoustic channel to allow acoustic energy into the offset volume); and making at least a portion of the enclosure from a flexible, low air permeable material.

At least one exemplary embodiment is directed to designing a hearing aid that has an inflation system attached as illustrated and discussed with respect to FIGS. 9A-9H. At least one exemplary embodiment is directed to a method of hearing aid fabrication comprising: scanning an ear mold and representing the ear mold as an ear mold computer simulation; trimming the ear mold computer simulation using software tools to generate a hearing aid simulated body; identifying at least one inflation groove on the hearing aid simulated body using software tools; and generating a modified hearing aid body simulation with the groove; identifying at least one inflation channel on the hearing aid simulated body using software tools; sending the modified hearing aid body simulation to an SLA machine and fabricating a hearing aid body from the SLA machine; attaching an inflation system into the at least one inflation groove; attaching an inflation line into the inflation channel, and attaching an inflation pump to an end of the inflation line.

At least one exemplary embodiment is directed to a hearing aid comprising: a microphone (e.g., Knowles TO series), a receiver (e.g., Knowles TWFK version); an inflation tube (e.g., inflation hoops); and an inflating device (e.g., manual and/or electrolysis), where the microphone samples an ambient environment and replays at least a portion of the ambient environment by the receiver, where the inflation tube is configured to expand to seal a channel in which the hearing aid is inserted, where any feedback is reduced by the expanding.

At least one exemplary embodiment is directed to a wax shield comprising: a body; a stressed flexible membrane; and where the membrane is attached to the body forming a wax shield, and where the wax shield is configured to be attached to a device with an acoustic channel, where the device is configured to be inserted into an ear canal; and additionally where the wax shield includes a membrane that has a reduced permeability to cerumen gas.

At least one exemplary embodiment is directed to a feedback reduction system comprising: an acoustic device (e.g., earpiece, hearing aid), which includes a receiver (speaker) and a microphone; and an inflation system attached to the acoustic device, where when inflated the inflation system acoustically isolates the microphone from the speaker reducing feedback from the microphone to the speaker.

At least one exemplary embodiment is directed to an increased stability mechanism comprising: an inflation system attached to an in-ear device (e.g., earpiece). When the inflation system is inflated the earpiece becomes more stable (e.g., more resistant to torque, and/or pull). Additionally during jaw motion the inflation system can react by compressing or expanding when the ear canal dimension changes.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions of the relevant exemplary embodiments. For example, if words such as "orthogonal", "perpendicular" are used the intended meaning is "substantially orthogonal" and "substantially perpendicular" respectively. Additionally although specific numbers may be quoted in the claims, it is intended that a number close to the one stated is also within the intended scope, i.e. any stated number (e.g., 20 mils) should be interpreted to be "about" the value of the stated number (e.g., about 20 mils). Terms such as "left," "right," "up," "down," "bottom," "top," "front," "back," "in," "out," and like are applicable to the embodiments shown and described in conjunction with the drawings. These terms are merely for purposes of description and do not necessarily apply to the position or manner in which the invention may be constructed for use.

Thus, the description of the invention is merely exemplary in nature and, thus, variations that do not depart from the gist of the invention are intended to be within the scope of the exemplary embodiments of the present invention. Such variations are not to be regarded as a departure from the spirit and scope of the present invention.

I claim:

1. A deformable eartip, comprising:
   a stent, wherein the stent is configured to include an acoustic channel, wherein the stent is configured to fit on an earpiece housing, and wherein the stent is configured to be removable from the earpiece housing;
   a membrane, wherein the membrane is sealed to the stent, wherein the sealed membrane is separated into a first chamber and a second chamber; and
   a flowable fillable material in the first chamber and the second chamber, wherein the first chamber is configured so that if compressed a first portion of the fillable material in the first chamber moves to the second chamber expanding the second chamber and reducing the first chamber, and wherein the second chamber is configured so that when the second chamber is expanded from an initial configuration it exerts a pressure forcing a second portion of the fillable material to the first chamber.

2. The eartip according to claim 1, wherein the fillable material is at least one of silicone, gel, or polymer or a combination thereof.

3. The eartip according to claim 1, wherein the fillable material is a gas.

4. The eartip according to claim 3, wherein the membrane is composed of at least one of polystyrene, polyethylene, nylon, polyethylene terephthalate, Teflon™, or Evoprene™ or a combination thereof.

5. The eartip according to claim 3, wherein the gauge pressure of the gas is between 0.001 bar and 2.0 bar.

6. The eartip according to claim 1, wherein the fillable material is a combination gas and liquid.

7. The eartip according to claim 1, wherein the first chamber and second chamber are connected by a channel.

8. The eartip according to claim 1, wherein the eartip is configured to be removably attached to a protrusion of the earpiece housing.

9. A method of operating a deformable eartip comprising:
   compressing a deformable first chamber so that a portion of flowable fillable material in the first chamber moves into a second chamber, expanding the second chamber; and
   inserting the first chamber into a user's ear canal, whereupon the expanded second chamber contracts pushing a second portion of flowable fillable material into the first chamber, expanding the first chamber to fill the user's ear canal, wherein the first chamber is formed by a first membrane on a first side and a stent on a second side, wherein the second chamber is formed by a second membrane on a third side and the stent on a fourth side, and wherein the stent includes an acoustic channel.

10. The method according to claim 9, wherein the flowable fillable material is at least one of silicone, gel, or polymer or a combination thereof.

11. The method according to claim 9, wherein the flowable fillable material is a gas.

12. The method according to claim 11, wherein the first and second membranes are composed of at least one of polystyrene, polyethylene, nylon, polyethylene terephthalate, Teflon™, or Evoprene™ or a combination thereof.

13. The method according to claim 11, wherein the first chamber and second chamber are connected by a channel.

14. The method according to claim 11, wherein the gauge pressure of the gas is between 0.001 bar and 2.0 bar.

15. The method according to claim 9, wherein the fillable material is a combination gas and liquid.

16. The method to claim 9, wherein the stent is configured to be removably attached to a protrusion of an earpiece housing.

* * * * *